(12) United States Patent
Son et al.

(10) Patent No.: US 10,952,259 B2
(45) Date of Patent: Mar. 16, 2021

(54) DEVICE AND METHOD FOR TRANSMITTING/RECEIVING DATA IN WIRELESS COMMUNICATION SYSTEM

(71) Applicant: Samsung Electronics Co., Ltd., Suwon-si (KR)

(72) Inventors: Hyuk-Min Son, Seoul (KR); Hyun-Kyu Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 136 days.

(21) Appl. No.: 16/063,161

(22) PCT Filed: Dec. 15, 2016

(86) PCT No.: PCT/KR2016/014731
§ 371 (c)(1),
(2) Date: Jun. 15, 2018

(87) PCT Pub. No.: WO2017/105108
PCT Pub. Date: Jun. 22, 2017

(65) Prior Publication Data
US 2019/0007968 A1    Jan. 3, 2019

(30) Foreign Application Priority Data

Dec. 15, 2015    (KR) .......................... 10-2015-0179549

(51) Int. Cl.
*H04W 74/08*    (2009.01)
*H04W 72/02*    (2009.01)
(Continued)

(52) U.S. Cl.
CPC ......... *H04W 74/085* (2013.01); *H04L 1/0003* (2013.01); *H04L 5/0048* (2013.01);
(Continued)

(58) Field of Classification Search
CPC . H04L 5/0005; H04L 5/0044; H04L 27/0006; H04L 27/2602; H04L 1/0003;
(Continued)

(56) References Cited

U.S. PATENT DOCUMENTS

2007/0064692 A1* 3/2007 Pi ..................... H04L 29/12283
370/389
2007/0230406 A1* 10/2007 Kim ..................... H04L 5/0044
370/335
(Continued)

FOREIGN PATENT DOCUMENTS

KR    10-2009-0021199 A    2/2009
KR    10-2014-0144106 A    12/2014
(Continued)

OTHER PUBLICATIONS

ISA/KR, "International Search Report and Written Opinion of the International Searching Authority," International Application No. PCT/KR2016/014731, dated Mar. 22, 2017, 22 pages.
(Continued)

*Primary Examiner* — Benjamin H Elliott, IV
*Assistant Examiner* — Prince A Mensah

(57) ABSTRACT

The present disclosure relates to a communication technique for converging, with an IoT technology, a 5G communication system for supporting a higher data transmission rate than a 4G system, and a system therefor. The present disclosure may be applied to intelligent services, such as smart homes, smart buildings, smart cities, smart cars or connected cars, health care, digital education, retail businesses, and security and safety related services, on the basis of 5G communication s technologies and IoT-related technologies. To this end, a communication device may determine control information for a superposition transmission, and acquire selection sources in response to the determined control information. The communication device may trans-
(Continued)

mit a preamble sequence on the basis of the acquired selection sources in a preamble transmission area according to the superposition transmission, and transmit data using the determined control information in a data superposition transmission area according to the superposition transmission.

17 Claims, 21 Drawing Sheets

(51) Int. Cl.
*H04W 72/12* (2009.01)
*H04W 74/00* (2009.01)
*H04L 1/00* (2006.01)
*H04L 5/00* (2006.01)
*H04L 27/26* (2006.01)
*H04L 12/26* (2006.01)

(52) U.S. Cl.
CPC ......... *H04L 27/2613* (2013.01); *H04W 72/02* (2013.01); *H04W 72/12* (2013.01); *H04W 72/1263* (2013.01); *H04W 74/00* (2013.01); *H04W 74/008* (2013.01); *H04W 74/08* (2013.01); *H04L 43/0864* (2013.01)

(58) Field of Classification Search
CPC ............... H04L 43/0864; H04L 5/0048; H04L 27/2613; H04W 72/02; H04W 72/12; H04W 72/1263; H04W 74/00; H04W 74/008; H04W 74/08
See application file for complete search history.

(56) References Cited

U.S. PATENT DOCUMENTS

| | | |
|---|---|---|
| 2009/0213802 A1 | 8/2009 | Miki et al. |
| 2010/0119003 A1 | 5/2010 | Terabe et al. |
| 2012/0281679 A1* | 11/2012 | Fan ..................... H04W 74/008 370/336 |
| 2014/0321360 A1 | 10/2014 | Han et al. |
| 2014/0362781 A1 | 12/2014 | Yun |
| 2015/0236932 A1* | 8/2015 | Yu ........................ H04B 17/309 370/252 |
| 2016/0192420 A1 | 6/2016 | Kim et al. |
| 2017/0202027 A1 | 7/2017 | Son |

FOREIGN PATENT DOCUMENTS

| | | |
|---|---|---|
| KR | 10-2016-0136949 A | 11/2016 |
| WO | 2015002432 A1 | 1/2015 |

OTHER PUBLICATIONS

NTT DOCOMO, "Evaluation methodologies for downlink multiuser superposition transmissions," R1-152063, 3GPP TSG RAN WG1 Meeting #80bis, Belgrade, Serbia, Apr. 20-24, 2015, 8 pages.
European Patent Office, "Supplementary European Search Report," Application No. EP 16876050.2, dated Oct. 7, 2018, 9 pages.
Kuo, Ping-Heng, "New Physical Layer Features of 3GPP LTE Release-13," Industry Perspectives, IEEE Wireless Communications, Aug. 2015, 2 pages.
NTT DOCOMO, "Evaluation methodologies for downlink multiuser superposition transmissions," R1-152063, 3GPP TSG RAN WG1 Meeting #80bis, Belgrade, Serbia, Apr. 20-24, 2015, 6 pages.

* cited by examiner

DEVICE AND METHOD FOR TRANSMITTING/RECEIVING DATA IN WIRELESS COMMUNICATION SYSTEM

CROSS-REFERENCE TO RELATED APPLICATIONS AND CLAIM OF PRIORITY

This application is a 371 National Stage of International Application No. PCT/KR2016/014731 filed Dec. 15, 2016, which claims priority to Korean Patent Application No. KR 10-2015-0179549 filed Dec. 15, 2015, the disclosures of which are herein incorporated by reference in their entirety.

BACKGROUND

1. Field

The present disclosure relates to a method and apparatus for transmitting and receiving data, based on superposition transmission in a wireless communication system.

2. Descriptions of Related Art

In order to meet wireless data traffic demands that have increased after commercialization of the 4th Generation (4G) communication system, efforts to develop an improved 5G communication system or a pre-5G communication system have been made. For this reason, the 5G communication system or the pre-5G communication system is called a beyond 4G network communication system or a post LTE system.

In order to achieve a high data transmission rate, implementation of the 5G communication system in an ultrahigh frequency (mmWave) band (e.g., 60 GHz band) is being considered. In the 5G communication system, technologies such as beamforming, massive Multi-Input Multi-Output (MIMO), full dimensional MIMO (FD-MIMO), array antenna, analog beam-forming, and large scale antenna are being discussed to mitigate propagation path loss in the ultrahigh frequency band and increase propagation transmission distance.

Furthermore, technologies such as an evolved small cell, an advanced small cell, a cloud radio access network (cloud RAN), an ultra-dense network, device to device communication (D2D), a wireless backhaul, a moving network, cooperative communication, coordinated multi-points (CoMP), and interference cancellation have been developed to improve the system network in the 5G communication system.

In addition, the 5G system has resulted in the development of advanced coding modulation (ACM) schemes such as hybrid FSK and QAM modulation (FQAM) and sliding window superposition coding (SWSC), and advanced access technologies such as filter bank multi carrier (FBMC), non-orthogonal multiple access (NOMA), and sparse code multiple access (SCMA).

Meanwhile, the Internet has evolved from a human-oriented connection network in which humans generate and consume information to an Internet of Things (IoT) network in which distributed components such as objects exchange and process information. Internet of Everything (IoE) technology may be an example of a combination of the IoT technology and big data processing technology via a connection with a cloud server.

In order to implement the IoT, technical factors such as a sensing technology, a wired/wireless communication and network infrastructure, a service interface technology, and a security technology are required, and, thus, research is being conducted on technologies such as a sensor network, machine to machine (M2M), machine type communication (MTC), and the like for a connection between objects.

In an IoT environment, via collection and analysis of data generated in connected objects, an intelligent Internet Technology (IT) service that creates new values in peoples' lives may be provided. The IoT may be applied to fields, such as a smart home, a smart building, a smart city, a smart car or connected car, a smart grid, healthcare, smart home appliance, a high-tech medical service or the like, via the convergence of the conventional Information Technology (IT) and various industries.

Accordingly, various attempts to apply the 5G communication to the IoT network are being made. For example, 5G communication technologies such as a sensor network, M2M communication, MTC, and the like are implemented by the schemes such as beamforming, MIMO, and array antenna. The application of a cloud RAN as the big data processing technology may be an example of convergence of the 5G technology and the IoT technology.

SUMMARY

Generally, in a IoT/MTC system in a wireless communication environment, a large number of devices maintain connection and periodically or sporadically transmit packets in parallel. To this end, there is a desire for an access technology that is capable of satisfying low power consumption and low latency. The access technologies may include a random access channel (RACH) used in LTE and carrier sense multiple access (CSMA) used in IEEE 802.11 series.

However, when RACH or CSMA are applied as access technology in the IoT/MTC system, low power consumption and low latency may not be satisfied. Therefore, there is a need for an access technology that can satisfy the low power consumption and low latency in a system that transmits data based on superposition transmission technology.

According to an embodiment of the present disclosure, a resource scheduling method and an apparatus therefor are provided, so as to prevent interference attributable to superposition transmission when a device transmits data based on superposition transmission.

Also, a beamforming-based system in an ultrahigh frequency (mmWave) band needs to use a predetermined beam for signal transmission and reception by taking into consideration that propagation path loss is high in the ultrahigh frequency band. To this end, a terminal may obtain optimal beam information associated with a base station, based on signals received before performing an access procedure with the base station. For example, the terminal receives and measures a synchronization signal transmitted from the base station via each transmission beam of the base station, and may determine an optimal reception beam of the terminal and an optimal transmission beam of the base station, based on a measurement result. According to an embodiment, the terminal receives and measures a beamformed reference signal transmitted from the base station via each transmission beam of the base station, other than the synchronization signal, and may determine an optimal reception beam of the terminal and an optimal transmission beam of the base station for data transmission and reception. Hereinafter, for ease of description, information associated with the optimal reception beam of the terminal and the optimal transmission beam of the base station, which is determined by the terminal, is referred to as optimal transmission beam information. Conversely, the base station is not aware of the optimal beam information associated with a terminal that is to attempt to access, and thus, the base station may not configure the beam of the base station and the beam of the terminal for receiving an access signal from the terminal. Therefore, in a ultrahigh frequency band, a beamforming-based system may need a method for a base station to obtain beam information of a terminal.

According to an embodiment of the present disclosure, there is provided a method and apparatus by which a base station selects a resource area to be used for an access procedure with a terminal, and transmits the selected resource area information to the terminal, whereby the base station and the terminal may perform data transmission/reception using desired beams between the base station and the terminal.

In accordance with an aspect of the present disclosure, a method of performing superposition transmission of data by a communication device is provided, wherein the method includes: determining control information for the superposition transmission; obtaining a selected resource, based on the determined control information; transmitting a preamble sequence, based on the obtained selected resource, in a preamble transmission area according to the superposition transmission; and transmitting data using the determined control information in a data superposition transmission area according to the superposition transmission.

In accordance with an aspect of the present disclosure, a communication device that performs superposition transmission of data includes: a control module configured to determine control information for the superposition transmission and to obtain a selected resource, based on the determined control information; and a communication module configured to transmit a preamble sequence, based on the obtained selected resource, in a preamble transmission area according to the superposition transmission; and to transmit data using the determined control information in a data superposition transmission area according to the superposition transmission.

In accordance with an aspect of the present disclosure, a method of receiving data based on superposition transmission by a communication device is provided, wherein the method includes: receiving a preamble sequence in a preamble transmission area according to the superposition transmission; obtaining, from the received preamble sequence, a selected resource used for transmitting the received preamble sequence; selecting a piece of control information corresponding to the obtained selected resource from among a plurality of pieces of previously set control information; receiving data transmitted in a data superposition transmission area according to the superposition transmission using the obtained selected resource; and decoding the received data using the selected control information.

In accordance with an aspect of the present disclosure, a communication device that receives data based on superposition transmission may include: a communication module configured to receive a preamble sequence in a preamble transmission area according to the superposition transmission and to receive data in a data superposition area according to the superposition transmission; and a control module configured to obtain, from the received preamble sequence, a selected resource used for transmitting the received preamble sequence; to select a piece of control information corresponding to the obtained selected resource from among a plurality of pieces of previously set control information; to decode the received data using the selected control information.

Advantageous Effects

According to various embodiments of the present disclosure, interference attributable to inefficient use of a transmission resource during superposition transmission may be prevented and the maximum number of devices supported may be increased. By using desired beams for an access procedure between a terminal and a base station, high pass loss occurring in a ultrahigh frequency band may be alleviated.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE DISCLOSURE

Figure 1A:
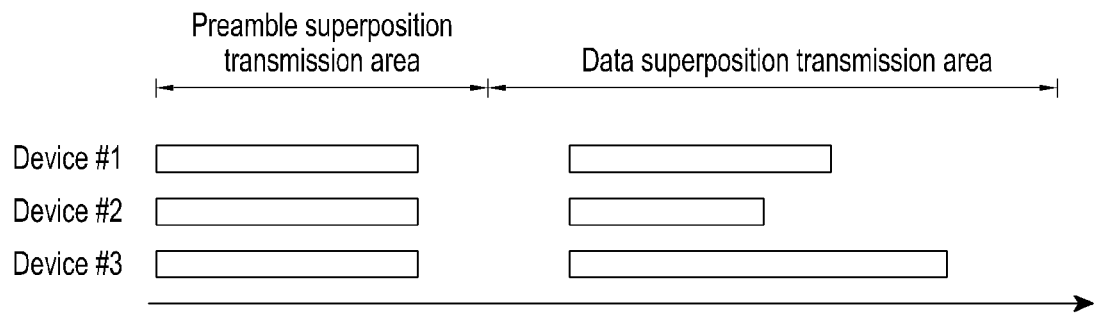
FIGS. 1A, 1B and 1C illustrate a superposition transmission scenario according to various proposed embodiments.

Hereinafter, various embodiments of the present disclosure will be described with reference to the accompanying drawings. However, it should be understood that there is no intent to limit the present disclosure to particular forms, and the present disclosure should be construed to cover all modifications, equivalents, and/or alternatives falling within the spirit and scope of the embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

Throughout the specification, the expressions "A or B," "at least one of A or/and B," "one or more of A or/and B," and the like may include all combinations of the listed items. For example, "A or B," "at least one of A and B," or "at least one of A or B" may refer to all cases of (1) including at least one A, (2) including at least one B, or (3) including both at least one A and at least one B.

The expression "a first", "a second", "the first", or "the second" used in various embodiments of the present disclosure may modify various components regardless of the order and/or the importance but does not limit the corresponding components. The above-described expressions may be used to distinguish an element from another element. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

As used herein, the expression "configured to" may be interchangeably used with the expression "suitable for", "having the capability to", "designed to", "adapted to", "made to", or "capable of". The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used in the present disclosure are only used to describe specific embodiments, and are not intended to limit the present disclosure. A singular expression may include a plural expression unless they are definitely different in a context. Unless defined otherwise, all terms used herein, including technical terms and scientific terms, may have the same meaning as commonly understood by a person of ordinary skill in the art to which the present disclosure pertains. Terms, such as those defined in commonly used dictionaries, should be interpreted as having a meaning that is the same or similar to their meaning in the context of the relevant art and will not be interpreted in an idealized or overly formal sense unless expressly so defined herein. In some cases, even the term defined in the present disclosure should not be interpreted to exclude embodiments of the present disclosure.

In the following various embodiments, there may be provided a method of efficiently sharing control information between a communication device that desires to transmit data, based on superposition transmission (hereinafter referred to as a "transmission device") and a communication device that desires to receive data, based on the superposition transmission (hereinafter referred to as a "reception device").

According to an embodiment, a transmission device determines a selected resource by taking into consideration control information, and performs superposition transmission using the determined selected resource, whereby a reception device obtains control information by a selected resource obtained during superposition transmission.

The control information may be information required for decoding data received based on superposition transmission. For example, the control information may include a transmission packet size, a modulation and coding scheme (MCS) level, a time offset for the data transmission in a data superposition transmission area, and the like.

The transmission packet size defines the size of a packet used when a communication device transmits data, based on superposition transmission. The MCS level defines a modulation scheme and a coding scheme of data to be transmitted based on the superposition transmission. The time offset defines the location for transmitting data within the data superposition transmission area where superposition transmission of data is performed by a plurality of communication devices.

The selected resource may be defined by information associated with a resource to be used for transmitting and receiving data, based on superposition transmission. For example, the selected resource may include a Random Access Opportunity (RAO), a Preamble Sequence Set (PSS), a Preamble Sequence (PS), and the like.

The RAO is information for designating an area where data is to be transmitted based on superposition transmission, the PSS is a set of a plurality of PSs, and the PS is a signal to be transmitted by a communication device for requesting superposition transmission.

As described above, when control information is determined, the transmission device prepares a selected resource, based on the determined control information, and transmits a preamble sequence for requesting superposition transmission using the prepared control information. After transmitting the preamble sequence, the transmission device may transmit data generated based on the control information within a determined time interval within a data superposition transmission area.

The reception device may receive a preamble sequence, may obtain control information using the whole or a part of the selected resource obtained from the received preamble sequence, and may decode data received in a determined time period within the data superposition transmission area, based on the obtained control information.

Hereinafter, various embodiments will be described in detail with reference to attached drawings.

Figure 1B:
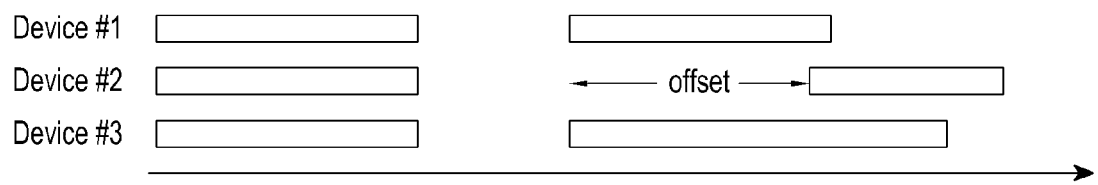
Figure 1C:
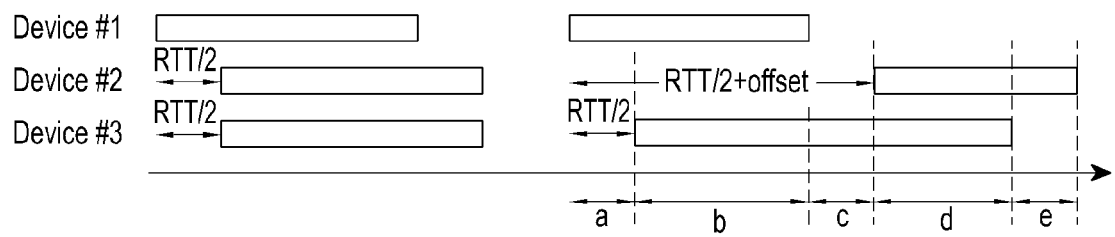

FIGS. 1A-C illustrate a superposition transmission scenario according to various proposed embodiments.

Referring to FIG. 1A, which illustrates an example of superposition transmission.

For example, it is assumed that three different users (devices #1, #2, and #3) accesses simultaneously. Each device (devices #1, #2, and #3) may attempt access for superposition transmission using a preamble sequence. The devices (devices #1, #2, and #3) may transmit data in a common resource area (data superposition transmission area).

The data superposition transmission area may correspond to a data transmission area for a transmission device, and may correspond to a data reception area for a reception device. Hereinafter, for ease of description, they are called by a common name "data superposition transmission area".

In this instance, when the devices (devices #1, #2, and #3) start data transmission at the same point in time within the data superposition transmission area, relative interference may be significantly high. For example, when encoded data in different sizes, which are to be transmitted by the devices (devices #1, #2, and #3), are transmitted at the start point of the data superposition transmission area, mutual interference may be concentrated on the front part of the data superposition transmission area, and mutual interference may be relatively low in the rear part of the data superposition transmission area. The phenomenon in which interference is concentrated on a predetermined area may similarly occur although a transmission delay time (e.g., a round trip time (RTT)) is taken into consideration.

Therefore, resource allocation scheduling needs to be performed so that inefficiency of resource use may be reduced and interference between users may be prevented from being concentrated on the front part of the data superposition transmission area. That is, scheduling needs to be performed so as to disperse data which are transmitted by devices (devices #1, #2, and #3) within the data superposition transmission area.

FIG. 1B illustrates an example of transmitting data by applying a time offset, so as to reduce mutual interference occurring in a data superposition transmission area, in the state in which a transmission device is not synchronized. The data superposition transmission area is configured to be wider than the maximum size of encoded data (or the maximum size of an encoded packet) by taking into consideration an RTT or the like.

For example, it is assumed that device #1 is close to a base station and has a significantly low RTT, and devices #2 and #3 have the same RTT. That is, it assumes a communication environment where a signal transmitted by device #1 arrives at the base station faster than signals transmitted by devices #2 and #3.

In this instance, devices #2 and #3 that are expected to have the same RTT may need to transmit data at different points in time within the data superposition transmission area, so as to reduce mutual interference. As an example, devices #2 may transmit data by applying a predetermined time offset. That is, the time offset may forcedly delay a point in time at which the base station receives data transmitted by device #2.

As an example, a time offset may be determined by selecting a preamble sequence. To this end, a data transmission location (time offset) different for each preamble sequence may be mapped. Preferably, a data transmission location (a time offset) may be mapped for each preamble sequence in consideration of mutual interference.

FIG. 1C illustrates an example in which a reception device receives a signal transmitted by a transmission device according to diagram (b). In this instance, it is assumed that a PSS or PS and a data transmission point may be mapped.

The base station detects preamble sequences transmitted by devices (devices #1, #2, and #3) in a preamble superposition transmission area (a preamble transmission area or a preamble reception area), receives data transmitted from the devices (devices #1, #2, and #3) within the data superposition transmission area, and decodes the received data.

For example, the base station may receive data transmitted by the devices (devices #1, #2, and #3) at different points in time so as to minimize mutual interference. This may be performed by using an RTT and a time offset.

Figure 2:
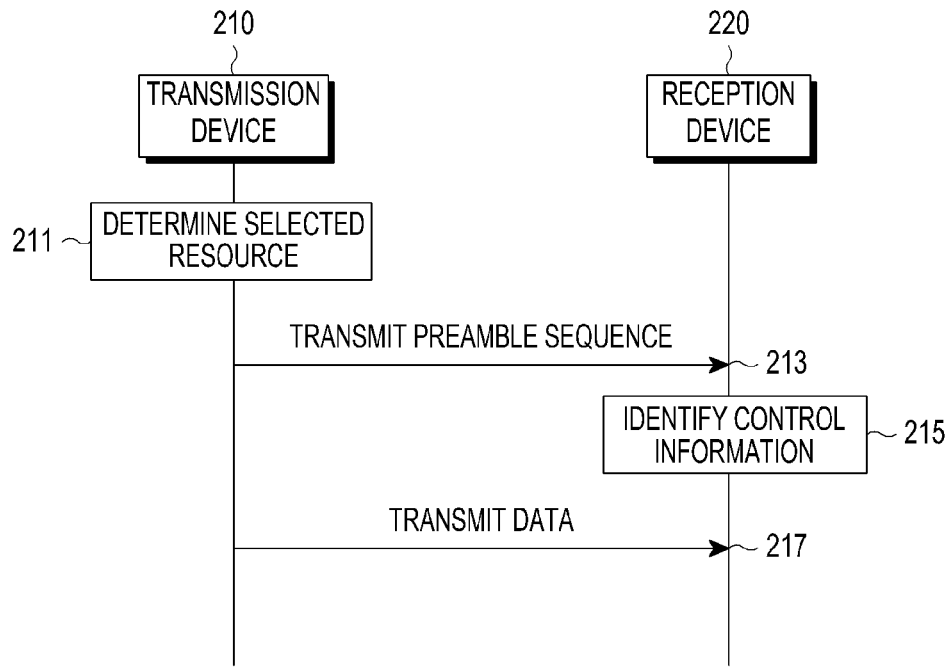
FIG. 2 is a diagram illustrating a processing procedure for superposition transmission according to various proposed embodiments.

FIG. 2 is a diagram illustrating a processing procedure for superposition transmission according to various proposed embodiments.

Referring to FIG. 2, a transmission device 210 determines a selected resource for superposition transmission in operation 211. For example, the transmission device 210 may determine a selected resource from among previously set selected resources using control information.

The transmission device 210 transmits a preamble sequence to a reception device 220 using the selected resource information in operation 213. The reception device receives the preamble sequence, obtains the selected resource, based on the received preamble sequence, and identifies control information using the obtained selected resource in operation 215.

The transmission device 210 encodes and modulates data based on the control information, and transmits the same to the reception device 220 in operation 217. The reception device 220 may decode and demodulate the received data using the identified control information.

The embodiment of FIG. 2 has illustrated a process in which the transmission device 210 transmits a preamble sequence and data independently via operations 213 to 217, but according to another embodiment, a transmission device may transmit a preamble sequence and data via a single signal transmission process. Specifically, a preamble superposition transmission area and a data superposition transmission area may be allocated in the same subframe. In this instance, by allocating a guard time between a preamble sequence transmission interval and a data transmission interval included in the time domain of the subframe, transmission area for each signal may be divided, whereby a preamble sequence and data may be transmitted in continuous time via the subframe.

Figure 3:
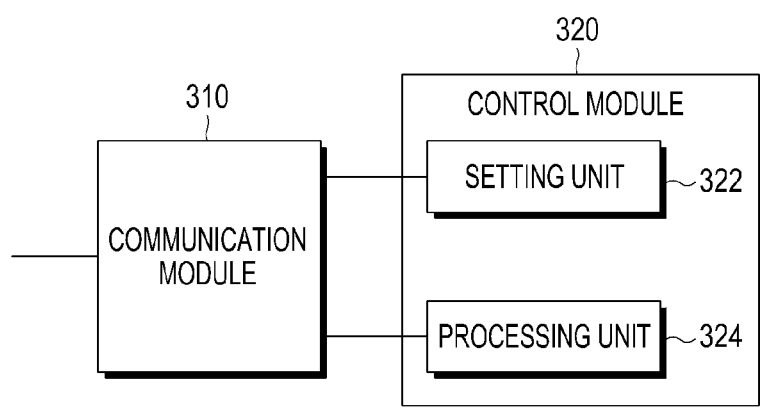
FIG. 3 is a block diagram illustrating a transmission device that performs superposition transmission of data according to various embodiments.

FIG. 3 is a block diagram illustrating a transmission device that performs superposition transmission of data according to various embodiments.

Referring to FIG. 3, the transmission device may include a control module 320 and a communication module 310. The control module 320 may include a setting unit 322 and a processing unit 324.

The control module 320 may determine control information for superposition transmission, and may obtain a selected resource, based on the determined control information. The control information may include a transmission packet size, a modulation and coding scheme (MCS) level, and a time offset for data transmission in a data superposition transmission area. The selected resource may include a random access opportunity (RAO), a preamble sequence set (PSS), and a preamble sequence (PS).

For example, when a variable packet size is used for superposition transmission, the control module 320 may previously set an RAO, a PSS, and a PS included in a selected resource to correspond to the transmission packet size, the MCS level, and the time offset included in the control information in a manner of one-to-one match.

According to an embodiment, the control module 320 may select one RAO corresponding to the transmission packet size included in the control information, from among a plurality of previously set RAOs. The control module 320 may select one PSS corresponding to the MCS level included in the control information, from among a plurality of previously set PSSs, and may select one PS from among the PSs in the selected PSS. The control module 320 may configure a selected resource using the selected RAO, PSS, and PS.

The control module 320 may estimate an RTT associated with superposition transmission, and may select a PS from among the PSs in the selected PSS by taking into consideration the estimated RTT and the size of an encoded packet.

A time offset previously set to correspond to the selected PS does not exceed the maximum time offset allowed within a data superposition transmission area, which is determined based on the estimated RTT and the size of an encoded packet.

The control module 320 may determine the time offset that is previously set to correspond to the selected PS as a time offset for data transmission within the data superposition transmission area. The control module 320 may include the determined time offset in control information.

According to another embodiment, the control module 320 may select one RAO supportable by the MCS level included in the control information, from among a plurality of previously set RAOs. The control module 320 may select one PSS corresponding to the MCS level from among a plurality of previously set PSSs, and may select one PS from among the PSs in the selected PSS. The control module 320 may configure a selected resource using the selected RAO, PSS, and PS.

The control module 320 may estimate an RTT associated with superposition transmission, and may select a PS from among the PSs in the selected PSS by taking into consideration the estimated RTT and the size of an encoded packet.

The time offset previously set to correspond to the selected PS does not exceed the maximum time offset allowed within the data superposition transmission area, which is determined based on the estimated RTT and the size of an encoded packet.

The control module 320 may determine a time offset that is previously set to correspond to the selected PS as a time offset for data transmission within the data superposition transmission area. The control module 320 may include the determined time offset in control information.

According to another embodiment, the control module 320 may select one RAO supportable by the MCS level included in the control information, from among a plurality of previously set RAOs. The control module 320 may select one PSS corresponding to the transmission packet size included in the control information from among a plurality of previously set PSSs, and may select one PS from among the PSs in the selected PSS. The control module 320 may configure a selected resource using the selected RAO, PSS, and PS.

The control module 320 may estimate an RTT associated with superposition transmission, and may select a PS from among the PSs in the selected PSS by taking into consideration the estimated RTT and the size of an encoded packet.

The time offset previously set to correspond to the selected PS does not exceed the maximum time offset allowed within a data superposition transmission area, which is determined based on the estimated RTT and the size of an encoded packet.

The control module 320 may determine the time offset that is previously set to correspond to the selected PS as a time offset for data transmission within the data superposition transmission area. The control module 320 may include the determined time offset in control information.

According to another embodiment, the control module 320 may estimate an RTT associated with superposition transmission, and may determine a single time offset that satisfies the maximum time offset allowed within the data superposition transmission area, which is determined based on the estimated RTT and the size of an encoded packet.

The control module 320 may select one RAO supportable by the MCS level included in the control information, from among a plurality of previously set RAOs. The control module 320 may select one PSS corresponding to the determined time offset from among a plurality of previously set PSSs, and may select one PS corresponding to the transmission packet size included in the control information from among the PSs in the selected PSS. The control module 320 may configure a selected resource using the selected RAO, PSS, and PS.

The control module 320 may determine the determined time offset as a time offset for data transmission within the data superposition transmission area. The control module 320 may include the determined time offset in control information.

According to another embodiment, the control module 320 may estimate an RTT associated with superposition transmission, and may determine a single time offset that satisfies the maximum time offset allowed within the data superposition transmission area, which is determined based on the estimated RTT and the size of an encoded packet.

The control module 320 may select one RAO corresponding to the transmission packet size included in the control information, from among a plurality of previously set RAOs. The control module 320 may select one PSS corresponding to the determined time offset from among a plurality of previously set PSSs, and may select one PS corresponding to the MCS level included in the control information from among the PSs in the selected PSS. The control module 320 may configure a selected resource using the selected RAO, PSS, and PS.

The control module 320 may determine the determined time offset as a time offset for data transmission within the data superposition transmission area. The control module 320 may include the determined time offset in control information.

In the above-described various embodiments, the control module 320 may select one PS from among the PSs in the selected PSS by taking into consideration at least one of a service quality associated with superposition transmission and a priority.

The communication module 310 may transmit a preamble sequence, based on a selected resource within a preamble transmission area associated with superposition transmission, according to the control of the control module 320. The communication module 310 may transmit data using control information within a data superposition transmission area associated with superposition transmission, according to the control of the control module 320.

Figure 4:
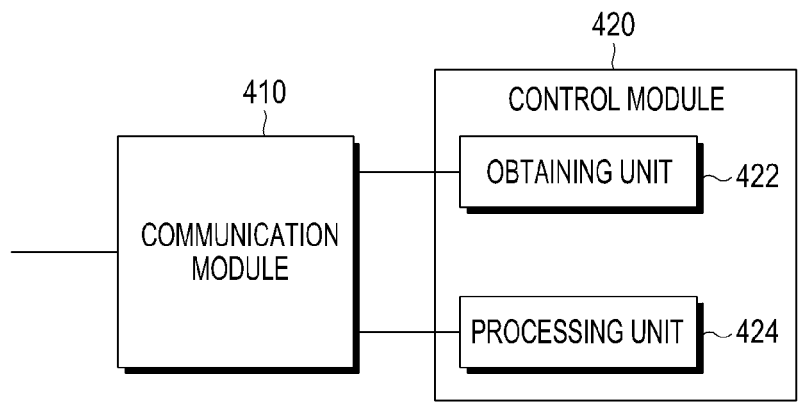
FIG. 4 is a block diagram illustrating a reception device that receives data, based on superposition transmission according to various embodiments.

FIG. 4 is a block diagram illustrating a reception device that receives data, based on superposition transmission according to various embodiments.

Referring to FIG. 4, the reception device may include a control module 420 and a communication module 410. The control module 420 may include an obtaining unit 422 and a processing unit 424.

The communication module 410 may receive a preamble sequence within a preamble transmission area associated with superposition transmission. The communication module 410 may receive data within a data superposition transmission area associated with superposition transmission. According to another embodiment, when a preamble transmission area and a data superposition area are allocated in the same subframe, the communication module 410 may receive a preamble sequence and data via the subframe. In this instance, the preamble sequence and the data may be received continuously, respectively, via a preamble sequence transmission interval and a data transmission interval in the time domain of the subframe. In this instance, a guard time may be allocated between the preamble sequence transmission interval and the data transmission interval.

The control module 420 may obtain a selected resource used by the transmission device, from the received preamble sequence. The control module 420 may select a piece of control information corresponding to the obtained selected resource from among a plurality of pieces of previously set control information, and may decode received data using the selected control information.

For example, the selected resource may include an RAO, a PSS, and a PS, and the control information may include a transmission packet size, a MCS level, and a time offset.

When a variable packet size is used for superposition transmission, the control module 420 may previously set a transmission packet size, an MCS level, and a time offset included in the control information to correspond to the RAO, the PSS, and the PS included in the selected resource in a manner of one-to-one match.

According to an embodiment, the control module 420 may detect an active PS from among superposed PSs in the received preamble sequence. The control module 420 may select one PSS including the detected active PS from among a plurality of previously set PSSs. The control module 420 may estimate an RTT when detecting the PS.

The control module 420 may obtain a transmission packet size from data received in a predetermined RAO, may obtain a MCS level previously set to correspond to the selected PSS, and may obtain a time offset previously set to correspond to the detected active PS.

The control module 420 may obtain a used MCS level from data received in a predetermined RAO, may obtain a transmission packet size previously set to correspond to the selected PSS, and may obtain a time offset previously set to correspond to the active PS.

The control module 420 may obtain a used MCS level from data received in a predetermined RAO, may obtain a time offset previously set to correspond to the selected PSS, and may obtain a transmission packet size previously set to correspond to the active PS.

The control module 420 may obtain a transmission packet size from data received in a predetermined RAO, may obtain a time offset previously set to correspond to the selected PSS, and may obtain a MCS level previously set to correspond to the active PS.

In various embodiments, examples will be provided according to scenarios based on a mapping relationship between a selected resource and control information. For example, various combinations that match an RAO, a PSS, and a PS included in a selected resource to a transmission packet size, an MCS level, and a time offset included in control information may exist. The MCS level may be replaced with a coverage class, an SNR, or the like.

In the following descriptions, five representative combinations will be proposed from among the scenarios based on a matching relationship between a selected resource and control information, and operations associated with superposition transmission performed by transmission and reception devices, based on the proposed combinations, will be described in detail. The five representative combinations are selected by taking into consideration that it is not allowed to transmit a time offset via an RAO selected from among RAOs set by a base station.

Figure 5:
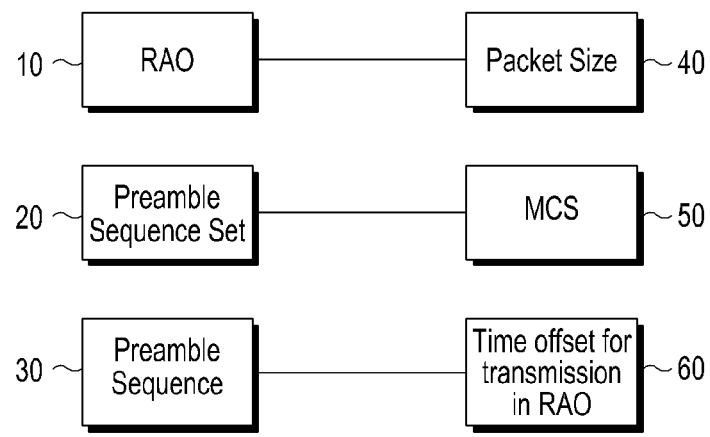
FIG. 5 is a diagram illustrating an example of a one-to-one match between a selected resource and control information according to a proposed embodiment.

FIG. 5 is a diagram illustrating an example of a one-to-one match between a selected resource and control information according to a proposed embodiment.

Referring to FIG. 5, it is assumed that an RAO 10 of selection resource is matched to a transmission packet size 40 of control information, a PSS 20 of the selection resource is matched to an MCS 50 of the control information, and a PS 30 of the selection resource is matched to a time offset 60 of the control information.

According to the scenario, a transmission device transmits, to a reception device, a transmission packet size using a predetermined RAO selected from among RAOs set by a base station, transmits, to the reception device, an MCS level using a predetermined PSS selected from among previously defined PSSs, and may transmit, to the reception device, a time offset for data transmission within a data superposition transmission area (RAO) using a predetermined PS selected from the selected predetermined PSS.

Table 1 shows an example of mapping a transmission packet size for each RAO.

TABLE 1

| | RAO | | | | | | |
|---|---|---|---|---|---|---|---|
| | RAO 1 | RAO 2 | RAO 3 | RAO 4 | RAO 5 | RAO 6 | RAO 7 |
| Transmission packet size | ~10 Byte | ~20 Byte | ~40 Byte | ~80 Byte | ~120 Byte | ~160 Byte | ~200 Byte |

In Table 1, seven RAOs (RAO 1 to RAO 7) are assumed, and the maximum transmission packet size is mapped for each RAO.

Information associated with the seven RAOs may be provided by the base station. When the size of a packet to be transmitted by a transmission device is determined, the transmission device may select a predetermined RAO based on the determined packet size. For example, when the transmission packet size is determined as 35 bytes, the transmission device may attempt to perform data transmission via RAO 3.

Table 2 shows an example of a MCS level one-to-one mapped for each PSS.

TABLE 2

| | PSS | | | | | | |
|---|---|---|---|---|---|---|---|
| | PSS 1 | PSS 2 | PSS 3 | PSS 4 | PSS 5 | PSS 6 | PSS 7 |
| MCS | 0 | 1 | 2 | 3 | 4 | 5 | 6 |

In Table 2, seven MCS levels and seven PSSs are one-to-one mapped. Accordingly, when a predetermined PSS is selected as a selected resource, a MCS level to which the selected PSS is matched may be indicated.

Table 3 shows an example of a plurality of MCS levels mapped to a single PSS.

TABLE 3

| | PSS | | | | | | |
|---|---|---|---|---|---|---|---|
| | PSS 1 | PSS 2 | PSS 3 | PSS 4 | PSS 5 | PSS 6 | PSS 7 |
| MCS | 0-1 | 2-3 | 4-5 | 6-7 | 8-9 | 10-11 | 12-13 |

In Table 3, 14 MCS levels are divided by two MCS levels and every two MCS levels are mapped to each of seven PSSs. Accordingly, when a predetermined PSS is selected as a selected resource, two MCS levels to which the selected PSS is matched may be indicated.

Table 4 shows an example of a time offset one-to-one mapped for each PS.

TABLE 4

| | PS | | | | | | |
|---|---|---|---|---|---|---|---|
| | PS 1 | PS 2 | PS 3 | PS 4 | PS 5 | PS 6 | PS 7 |
| Time Offset | $\Delta$ | $2\Delta$ | $3\Delta$ | $4\Delta$ | $5\Delta$ | $6\Delta$ | $7\Delta$ |

In Table 4, seven PSs and seven time offsets are one-to-one mapped. Accordingly, when a predetermined PS is selected as a selected resource, a time offset to which the selected PS is matched may be indicated.

As a method of setting a time offset, there is a method of mapping a time offset in a manner that defines a $\Delta$ value having a predetermined size to be appropriate for the frame structure of a system, and scales the $\Delta$ value for each PS included in a PSS. Various examples of mapping a $\Delta$ value for each PS may exist.

Figure 6:
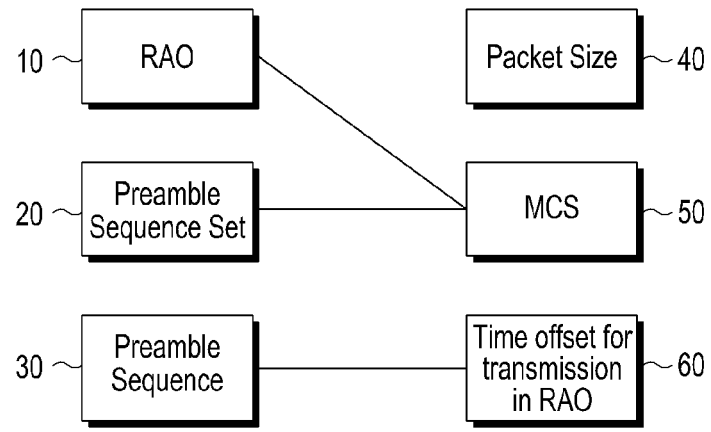
FIG. 6 is a diagram illustrating an example of a match between a selected resource and control information according to a proposed embodiment.

FIG. 6 is a diagram illustrating an example of a match between a selected resource and control information according to a proposed embodiment. FIG. 6 assumes a communication environment that uses a fixed packet size.

Referring to FIG. 6, in the case of an environment that uses a transmission packet having a fixed size 40 in IoT or the 5G communication system, corresponding information (transmission packet size) 40 may not need to be reported to a reception device. Accordingly, a scenario is assumed in which the combination of the RAO 10 and the PSS 20 of selection resource is matched to the MCS 50 of the control information, and the PS 30 of the selection resource is matched to the time offset 60 of the control information.

According to the scenario, a transmission device may use a predetermined PSS selected from among previously defined PSSs, so as to indicate one of the MCSs supportable in a predetermined RAO selected from among RAOs set by a base station. The transmission device may select a predetermined PS from the selected predetermined PSS, and may indicate a time offset for data transmission within a data superposition transmission area (RAO) using the selected predetermined PS.

Table 5 shows an example of indicating a MCS using the combination of an RAO and a PSS.

TABLE 5

| RAO | PSS | MCS |
|---|---|---|
| RAO 1 | PSS #1 | 0 |
| | PSS #2 | 1 |
| | PSS #3 | 2 |
| | PSS #4 | 3 |
| RAO 2 | PSS #1 | 4 |
| | PSS #2 | 5 |
| | PSS #3 | 6 |
| | PSS #4 | 7 |

According to Table 5, eight MCSs are divided into two groups, a group is mapped to one RAO, and a PSS indicates one of the four MCS mapped to the one RAO. For example, when RAO 1 is selected, MCSs 0 to 3 may be selected as candidate MCSs. When PSS #3 is used, MCS 2 may be indicated from among the candidate MCSs, MCSs 0 to 3.

Figure 7:
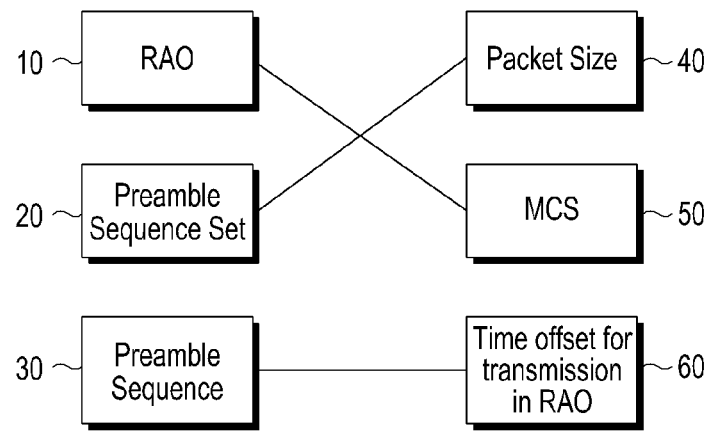
FIG. 7 is a diagram illustrating an example of a one-to-one match between a selected resource and control information according to a proposed embodiment.

FIG. 7 is a diagram illustrating an example of a one-to-one match between a selected resource and control information according to a proposed embodiment.

Referring to FIG. 7, it is assumed that the RAO 10 of selection resource is matched to the MCS level 50 of control information, the PSS 20 of the selection resource is matched to the transmission packet size 40 of the control information, and the PS 30 of the selection resource is matched to the time offset 60 of the control information.

According to the scenario, a transmission device transmits, to a reception device, a MCS level using a predetermined RAO selected from among the RAOs set by the base station, transmits, to the reception device, a transmission packet size using a predetermined PSS selected from among previously defined PSSs, and transmits, to the reception device, a time offset for data transmission within a data superposition transmission area (RAO) using a predetermined PS selected from the selected predetermined PSS.

Table 6 shows an example of mapping a MCS level for each RAO.

TABLE 6

| | RAO | | | | | | |
|---|---|---|---|---|---|---|---|
| | RAO 1 | RAO 2 | RAO 3 | RAO 4 | RAO 5 | RAO 6 | RAO 7 |
| MCS | 0 | 1 | 2 | 3 | 4 | 5 | 6 |

In Table 6, seven MCS levels and seven RAOs are one-to-one mapped. Accordingly, when a predetermined RAO is selected as a selected resource, a MCS level to which the selected RAO is matched may be indicated.

Table 7 shows an example of a plurality of MCS levels mapped to an RAO.

TABLE 7

| | RAO | | | | | | |
|---|---|---|---|---|---|---|---|
| | RAO 1 | RAO 2 | RAO 3 | RAO 4 | RAO 5 | RAO 6 | RAO 7 |
| MCS | 0-1 | 2-3 | 4-5 | 6-7 | 8-9 | 10-11 | 12-13 |

In Table 7, 14 MCS levels are divided by two MCS levels and every two MCS levels are mapped to each of seven RAOs. Accordingly, when a predetermined RAO is selected as a selected resource, two MCS levels to which the selected RAO is matched may be indicated.

Table 8 shows an example of mapping a transmission packet size for each PSS.

TABLE 8

| | RAO | | | | | | |
|---|---|---|---|---|---|---|---|
| | RAO 1 | RAO 2 | RAO 3 | RAO 4 | RAO 5 | RAO 6 | RAO 7 |
| Transmission packet size | ~10 Byte | ~20 Byte | ~40 Byte | ~80 Byte | ~120 Byte | ~160 Byte | ~200 Byte |

In Table 8, seven PSSs (PSS 1 to PSS 7) are assumed, and the maximum transmission packet size is mapped for each PSS.

When the size of a packet to be transmitted by the transmission device is determined, the transmission device may select a predetermined PSS based on the determined packet size. For example, when the transmission packet size is determined as 78 bytes, the transmission device may use PSS 4 for transmitting a PS.

Figure 8:
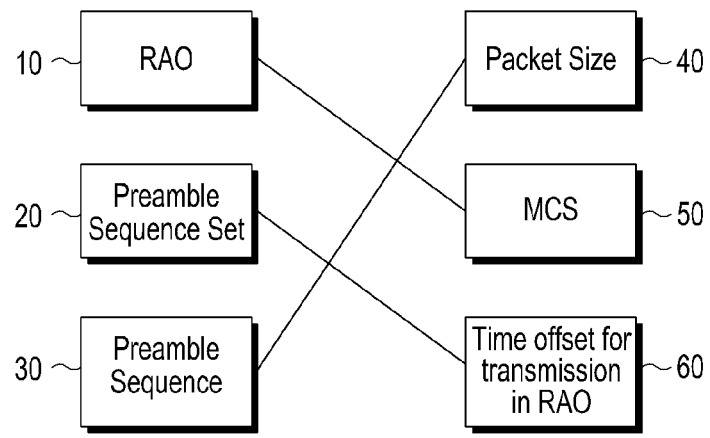
FIG. 8 is a diagram illustrating an example of a one-to-one match between a selected resource and control information according to a proposed embodiment.

FIG. 8 is a diagram illustrating an example of a one-to-one match between a selected resource and control information according to a proposed embodiment.

Referring to FIG. 8, it is assumed that the RAO 10 of selection resource is matched to the MCS level 50 of control information, the PSS 20 of the selection resource is matched to time offset 60 of the control information, and the PS 30 of the selection resource is matched to the transmission packet size 40 of the control information.

According to the scenario, a transmission device transmits, to a reception device, a MCS level using a predetermined RAO selected from among the RAOs set by a base station, transmits, to the reception device, a time offset for data transmission within a data superposition transmission area (RAO) using a predetermined PSS selected from among previously defined PSSs, and transmits, to the reception device, a transmission packet size using a predetermined PS selected from the selected predetermined PSS.

Figure 9:
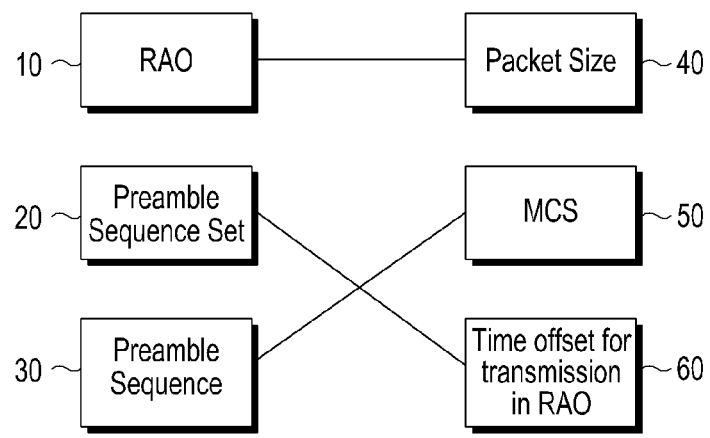
FIG. 9 is a diagram illustrating an example of a one-to-one match between a selected resource and control information according to a proposed embodiment.

FIG. 9 is a diagram illustrating an example of a one-to-one match between a selected resource and control information according to a proposed embodiment.

Referring to FIG. 9, it is assumed that the RAO 10 of selection resource is matched to the transmission packet size 40 of control information, the PSS 20 of the selection resource is matched to time offset 60 of the control information, and the PS 30 of the selection resource is matched to the MCS level 50 of the control information.

According to the scenario, a transmission device transmits, to a reception device, a transmission packet size using a predetermined RAO selected from among the RAOs set by a base station, transmits, to the reception device, a time offset for data transmission within a data superposition transmission area (RAO) using a predetermined PSS selected from among previously defined PSSs, and transmits, to the reception device, a MCS level using a predetermined PS selected from the selected predetermined PSS.

Figure 10:
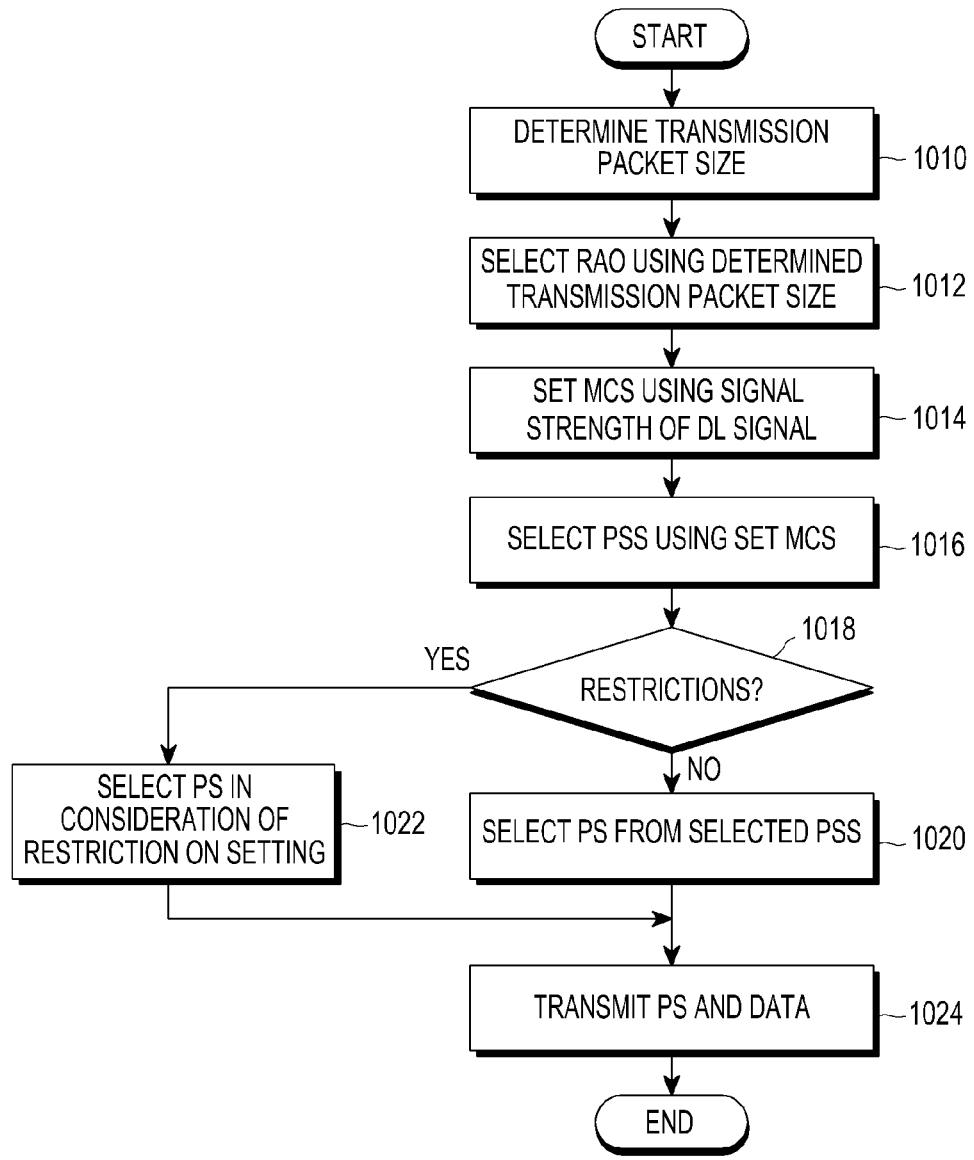
FIG. 10 is a diagram illustrating a control flow for performing superposition transmission by a transmission device according to various embodiments.

FIG. 10 is a diagram illustrating a control flow for performing superposition transmission by a transmission device according to various embodiments. The control flow in FIG. 10 assumes the mapping relationship between a selected resource and control information of FIG. 5.

Referring to FIG. 10, the transmission device determines a transmission packet size for data transmission in operation 1010. For example, the determined transmission packet size may be a packet size after a packet is encoded.

The transmission device selects an RAO previously set to correspond to the determined transmission packet size in operation 1012. The transmission device measures the strength of a downlink signal, and sets a MCS level corresponding to the measured signal strength in operation 1014. The transmission device selects a PSS previously set to correspond to the set MCS level in operation 1016.

The transmission device determines whether restrictions on the usage of a time offset are set in association with the size of an encoded packet in a synchronous environment or an asynchronous environment in operation 1018. The restrictions on the usage of a time offset is to prepare an allowable time offset in order to prevent an event in which data is received outside a data superposition transmission area.

For example, the entire length of the data superposition transmission area may be limited by setting by the base station. Accordingly, restrictions on a time offset may need to be set in consideration of the size of an encoded packet that the device desires to transmit or a reception delay (RTT) that may occur in an asynchronous environment.

In operation 1020, the transmission device may select any one of PSs included in the PSS selected by the MCS, when restrictions on a time offset are not set. When the restrictions on a time offset are set, the transmission device calculates an allowable time offset, and selects a PS in consideration of the calculated allowable time offset in operation 1022.

For example, the transmission device may select at least one PS corresponding to a time offset that satisfies the calculated allowable time offset, from among PSs included in the PSS selected based on the MCS. The transmission device may select any PS from the at least one selected PS.

As another example, the transmission device maps a time offset selected based on the allowable time offset to PSs, whereby a time offset that satisfies the allowable time offset may be used although any PS is selected from the selected PSS.

The allowable time offset may be determined to be different according to a synchronous environment and an asynchronous environment.

For example, in the synchronous environment, an RTT does not need to be taken into consideration. Accordingly, the transmission device may determine the allowable time offset by subtracting the size of an encoded packet from the entire length of the data superposition transmission area. Furthermore, a value corresponding to a guard interval may be set, and the value may be additionally subtracted.

Conversely, in the asynchronous environment, an RTT needs to be taken into consideration. The transmission device may determine the allowable time offset by subtracting one-way delay time (RTT/2) and the size of an encoded packet from the entire length of the data superposition transmission area. Furthermore, a value corresponding to a guard interval may be set, and the value may be additionally subtracted.

To this end, the transmission device needs to be capable of estimating an RTT. For example, the RTT may be estimated based on the signal strength of a downlink signal.

The transmission device transmits the selected PS in a preamble superposition transmission area, and transmits data encoded and modulated based on the determined control information, using the time offset previously set to correspond to the selected PS.

Figure 11:
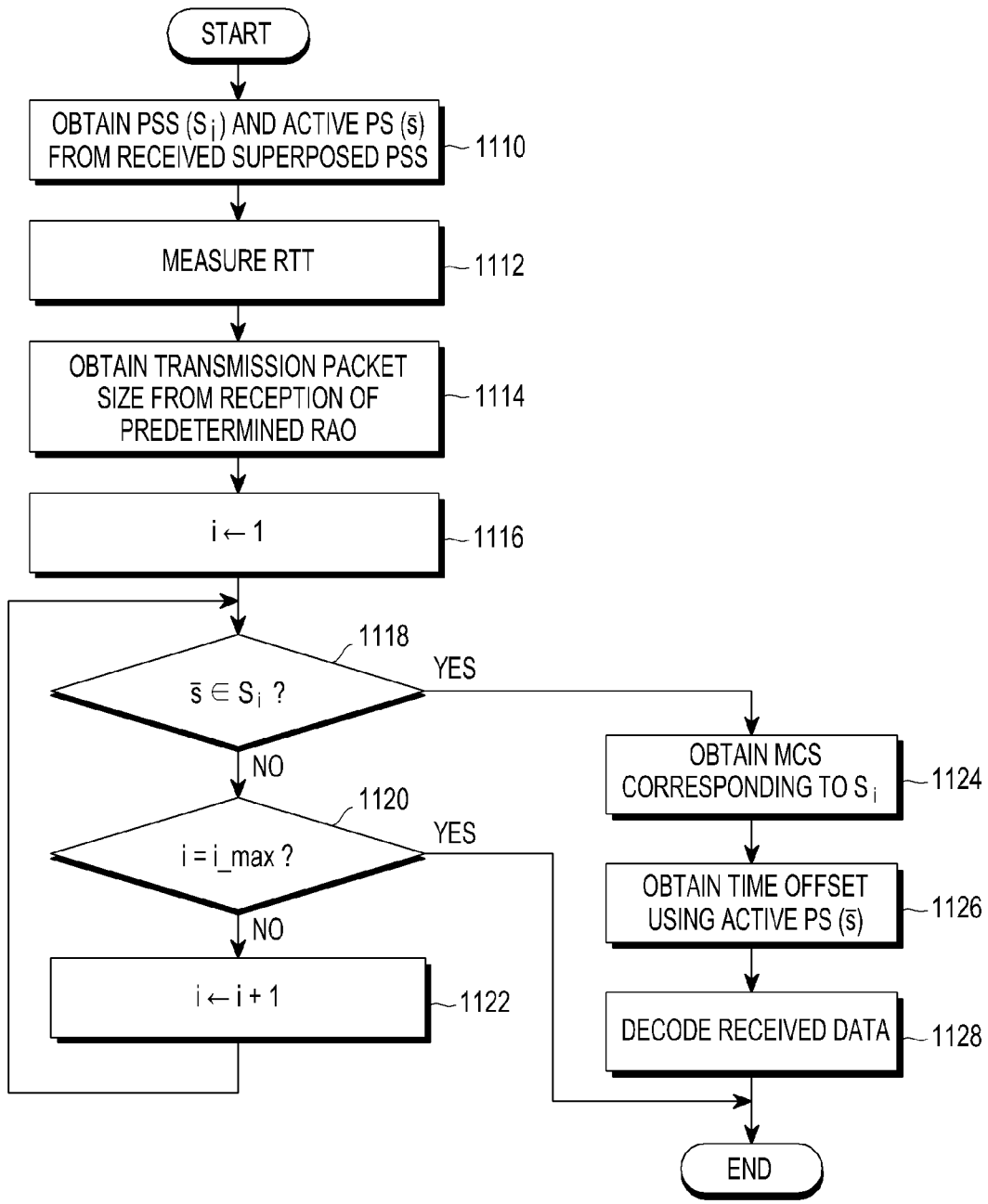
FIG. 11 is a diagram illustrating a control flow for performing superposition transmission by a reception device according to various embodiments.

FIG. 11 is a diagram illustrating a control flow for performing superposition transmission by a reception device according to various embodiments. The control flow in FIG. 11 assumes the mapping relationship between a selected resource and control information of FIG. 5.

Referring to FIG. 11, the reception device detects an active PS (S) from among PSs which are transmitted based on superposition transmission by a plurality of transmission devices in a preamble superposition transmission area, and obtains a PSS including the detected active PS in operation 1110.

In operation 1112, the reception device measures an RTT based on a difference between the start point of a preamble reception area and a point in time at which the active PS is detected, when detecting the active PS. The reception device obtains the size of a transmission packet from reception of a predetermined RAO in operation 1114. For example, in a process of receiving data in a predetermined RAO, from detection of a PSS, the reception device may obtain MCS information and a transmission packet size of a transmission device, or may obtain candidate MCSs used for transmission or information associated with a candidate group.

The reception device determines a PSS to which the obtained active PS belongs in operations 1116 to 1122. For example, the reception device initiates index i for selecting a PSS to 1 in operation 1116. The reception device determines whether the obtained PS belongs to an $i^{th}$ PSS in operation 1118. When the obtained PS does not belong to the $i^{th}$ PSS, the reception device determines whether the current i is the maximum value (i_max) in operation 1120. That is, whether the active PS is included is checked with respect to all PSSs. When all PSSs are not completely checked, the reception device may increase index i by 1, so as to select a subsequent PSS in operation 1122.

As described above, the reception device may identify a PSS that includes the active PS from among the previously set PSSs.

When the PSS including the active PS is identified, the reception device may obtain a MCS previously set to correspond to the identified PSS in operation 1124. The reception device obtains a time offset previously set to correspond to the active PS in operation 1126.

The reception device may decode the received data using the obtained control information, that is, the transmission packet size, the MCS, or the like in operation 1128. That is, the reception device may obtain the MCS information, the transmission packet size, the RTT information, and the time offset based on the active PS obtained from the received PS, whereby the reception device may decode data received in the data superposition transmission area, using the obtained information.

Figure 12:
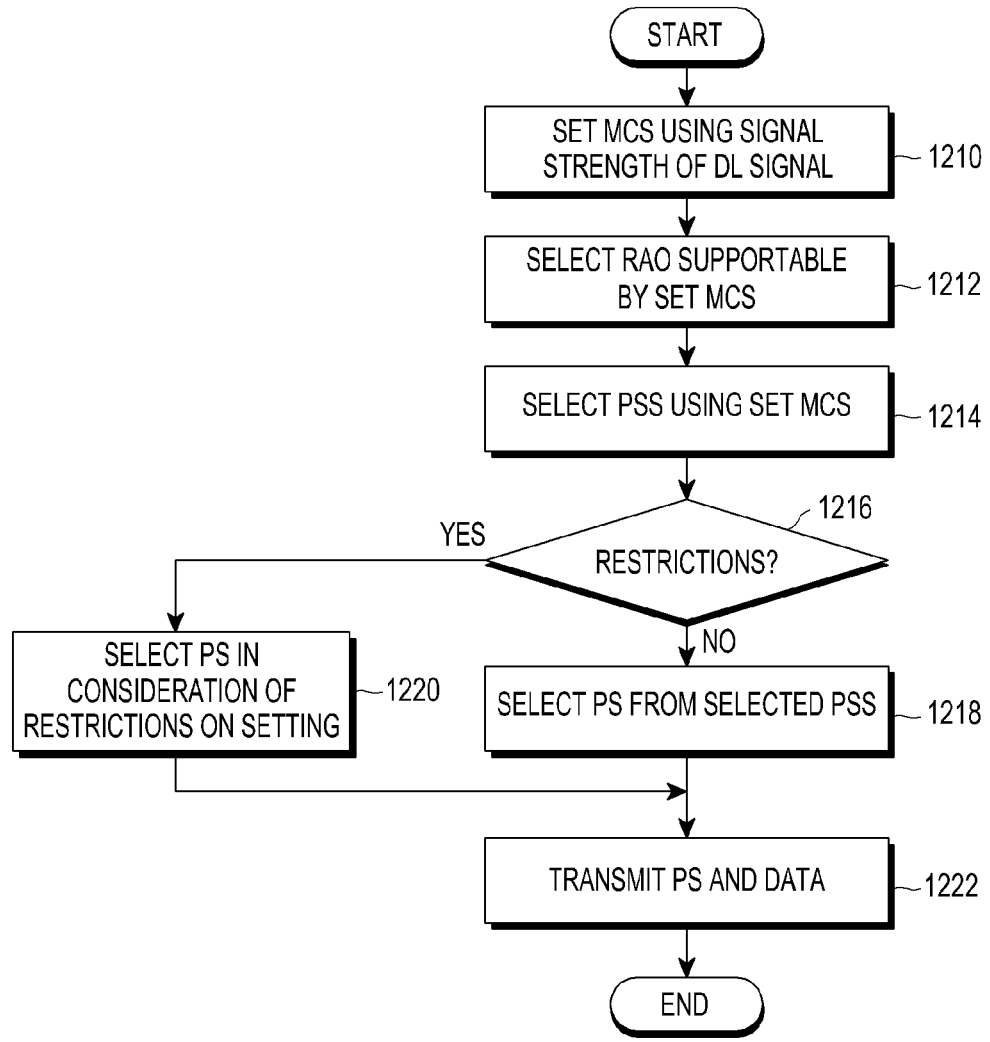
FIG. 12 is a diagram illustrating a control flow for performing superposition transmission by a transmission device according to various embodiments.

FIG. 12 is a diagram illustrating a control flow for performing superposition transmission by a transmission device according to various embodiments. The control flow in FIG. 12 assumes the mapping relationship between a selected resource and control information of FIG. 6.

Referring to FIG. 12, the transmission device measures the strength of a DL signal, and sets a MCS level corresponding to the measured signal strength in operation 1210. The transmission device may select an RAO supportable by the set MCS level in operation 1212. The transmission device selects a PSS previously set to correspond to the set MCS level in operation 1214.

The transmission device determines whether restrictions on the usage of a time offset are set in association with the size of an encoded packet in a synchronous environment or an asynchronous environment in operation 1216. The restrictions on the usage of a time offset is to prepare an allowable time offset in order to prevent an event in which data is received outside a data superposition transmission area.

For example, the entire length of the data superposition transmission area may be limited by setting by the base station. Accordingly, restrictions on a time offset may need to be set in consideration of the size of the encoded packet that the device desires to transmit or a reception delay (RTT) may occur in an asynchronous environment.

In operation 1218, the transmission device may select any one of PSs included in the PSS selected by the MCS, when restrictions on a time offset are not set. When the restrictions on a time offset are set, the transmission device calculates an allowable time offset, and selects a PS in consideration of the calculated allowable time offset in operation 1220.

For example, the transmission device may select at least one PS corresponding to a time offset that satisfies the calculated allowable time offset, from among PSs included in the PSS selected based on the MCS level. The transmission device may select any PS from the at least one selected PS.

As another example, the transmission device maps a time offset selected based on the allowable time offset to PSs, whereby a time offset that satisfies the allowable time offset may be used although any PS is selected from the selected PSS.

The allowable time offset may be determined to be different according to a synchronous environment and an asynchronous environment.

For example, in the synchronous environment, an RTT does not need to be taken into consideration. Accordingly, the transmission device may determine the allowable time offset by subtracting the size of an encoded packet from the entire length of the data superposition transmission area. Furthermore, a value corresponding to a guard interval may be set, and value may be additionally subtracted.

Conversely, in the asynchronous environment, an RTT needs to be taken into consideration. The transmission device may determine the allowable time offset by subtracting one-way delay time (RTT/2) and the size of an encoded packet from the entire length of the data superposition transmission area. Furthermore, a value corresponding to a guard interval may be set, and the value may be additionally subtracted.

To this end, the transmission device may be capable of estimating an RTT. For example, the RTT may be estimated based on the signal strength of a downlink signal.

The transmission device transmits the selected PS in a preamble superposition transmission area, and transmits data encoded and modulated based on the determined control information, using the time offset previously set to correspond to the selected PS in operation 1222.

Figure 13:
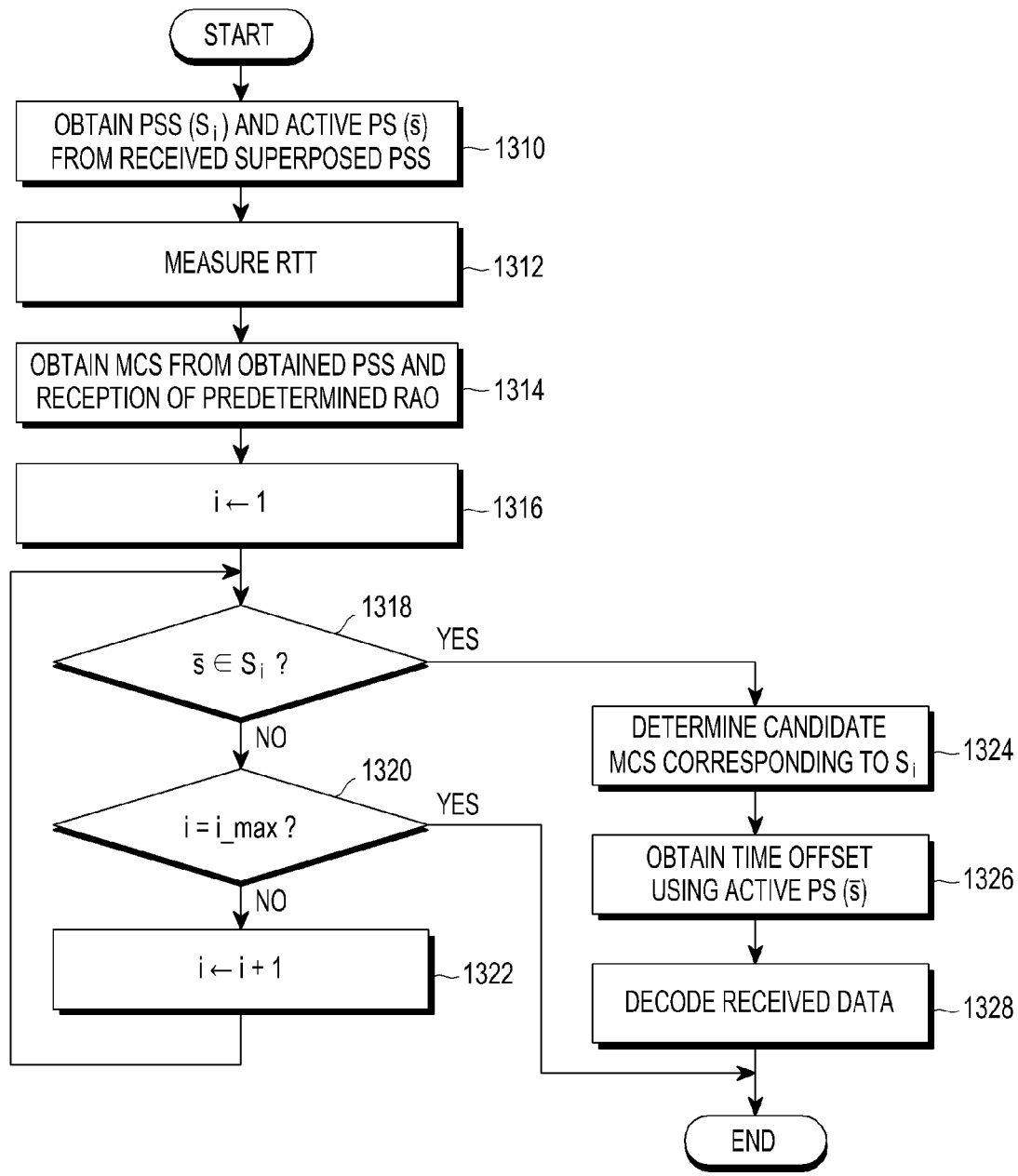
FIG. 13 is a diagram illustrating a control flow for performing superposition transmission by a reception device according to various embodiments.

FIG. 13 is a diagram illustrating a control flow for performing superposition transmission by a reception device according to various embodiments. The control flow in FIG. 13 assumes the mapping relationship between a selected resource and control information of FIG. 6.

Referring to FIG. 13, the reception device detects an active PS (s) from among PSs which are transmitted based on superposition transmission by a plurality of transmission devices in a preamble superposition transmission area, and obtains a PSS including the detected active PS in operation 1310.

The reception device measures an RTT based on a difference between the start point of a preamble reception area and a point in time at which the active PS is detected, when detecting the active PS in operation 1312.

The reception device obtains an MCS level from the obtained PSS and reception of a predetermined RAO in operation 1314.

The reception device determines a PSS to which the obtained active PS belongs in operations 1316 to 1322. For example, the reception device initiates index i for selecting a PSS to 1 in operation 1316. The reception device determines whether the obtained PS belongs to an $i^{th}$ PSS in operation 1318. When the obtained PS does not belong to the $i^{th}$ PSS, the reception device determines whether the current i is the maximum value (i_max) in operation 1320. That is, whether the active PS is included is checked with respect to all PSSs. When all PSSs are not checked, the reception device may increase index i by 1, so as to select a subsequent PSS in operation 1322.

As described above, the reception device may identify a PSS that includes the active PS from among the previously set PSSs.

When the PSS including the active PS is identified, the reception device may obtain a candidate MCS level from among MCS levels previously set to correspond to the identified PSS in operation 1324. The reception device obtains a time offset previously set to correspond to the active PS in operation 1326.

The reception device may decode received data using the obtained control information, that is, the transmission packet size, the MCS, or the like in operation 1328. That is, the reception device may obtain MCS information, the transmission packet size, the RTT information, and the time offset based on the active PS obtained from the received PS, whereby the reception device may decode the data received in the data superposition transmission area, using the obtained information.

Figure 14A:
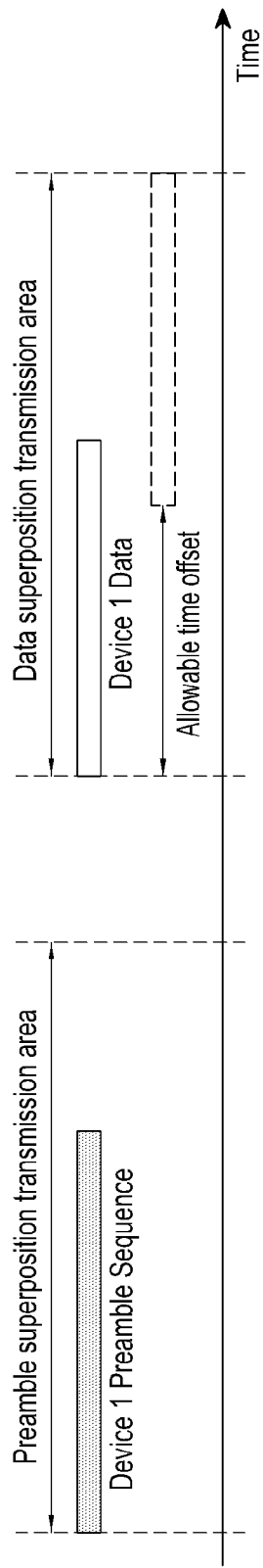
FIGS. 14A, 14B, and 14C illustrate examples of restrictions on setting a time offset according to various embodiments.
Figure 14B:
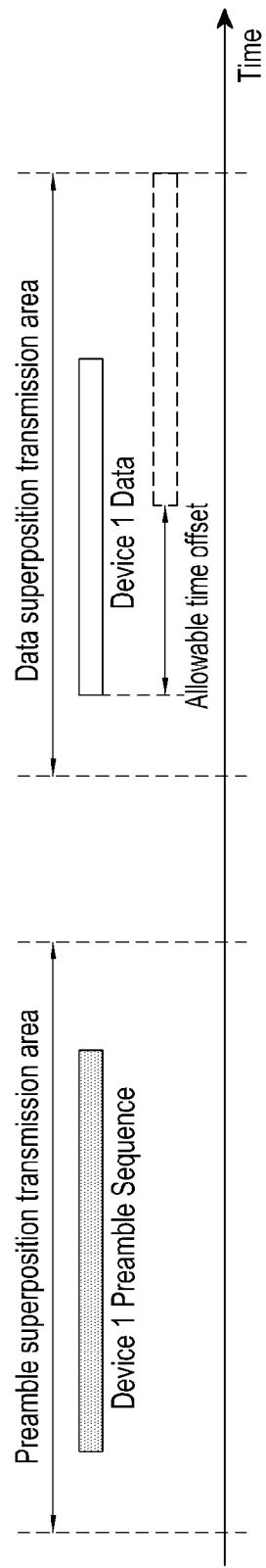
Figure 14C:
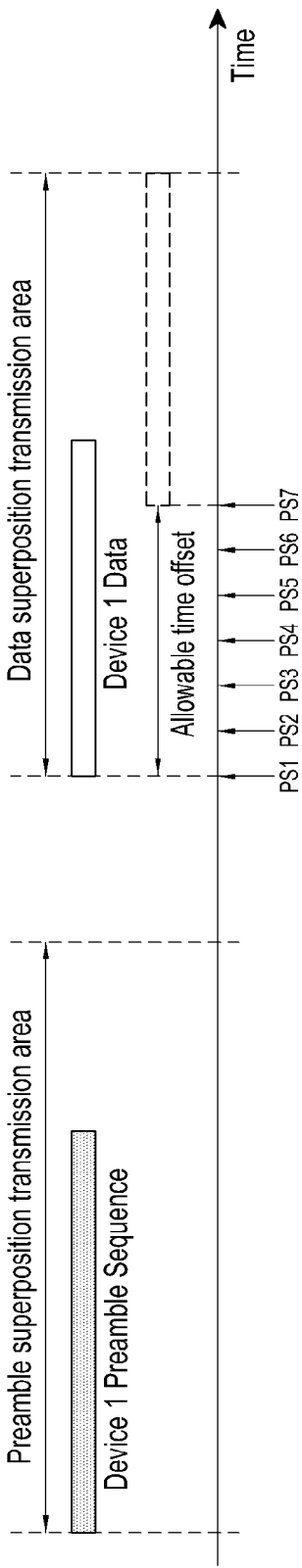

FIGS. 14A-C illustrate examples of restrictions on setting of a time offset according to various embodiments.

Referring to FIG. 14A illustrates restrictions on setting of a time offset in association with the size of an encoded packet in a synchronous environment. When a transmission packet size is large within a data superposition transmission area (an RAO resource area) as given in diagram (a), an allowable time offset may be calculated by an equation: the size of the entire data superposition transmission area—the size of an encoded packet.

FIG. 14B illustrates restrictions on setting of a time offset in association with the size of an encoded packet in an asynchronous environment. In this instance, the length of allowable time offset may be decreased. In the case of diagram (b), the allowable time offset may be calculated by an equation: the size of the entire data superposition transmission area—RTT/2—the size of an encoded packet. In this instance, the RTT needs to be estimated based on the reception strength of a DL signal.

Operation schemes of the transmission device of diagrams (a) and (b) may include two embodiments. When the transmission device selects a PS, restrictions may be defined such that a PS is selected based on an estimated RTT and the size of an encoded packet, or time offsets of corresponding PSs are defined to be mapped to relative values within an allowable time offset.

Unlike FIG. 14B, FIG. 14C illustrates an example of a scheme that is different from restrictive PS selection. For example, when the transmission device calculates an allowable time offset and arbitrarily selects a PS, the transmission device may select a relative time offset mapped thereto. Subsequently, the transmission device may calculate the absolute time offset, based on the calculated allowable time offset.

Table 9 shows an example of mapping a relative time offset to a reference PS.

TABLE 9

| | PS | | | | | | |
|---|---|---|---|---|---|---|---|
| | PS 1 | PS 2 | PS 3 | PS 4 | PS 5 | PS 6 | PS 7 |
| Time Offset | 0 | 1/6 | 2/6 | 3/6 | 4/6 | 5/6 | 6/6 |

According to Table 9, one of the seven allowable time offsets (0, 1/6, 2/6, 3/6, 4/6, 5/6, and 6/6) may be selected based on a PS. For example, when PS 3 is selected, 2/6 may be selected from among the seven allowable time offsets (0, 1/6, 2/6, 3/6, 4/6, 5/6, 6/6). In this instance, as shown in FIG. 14C, when it is assumed that a third timing value is calculated within the entire allowable time offset range and the entire allowable time offset is 6, the absolute time offset may be 2.

Figure 15:
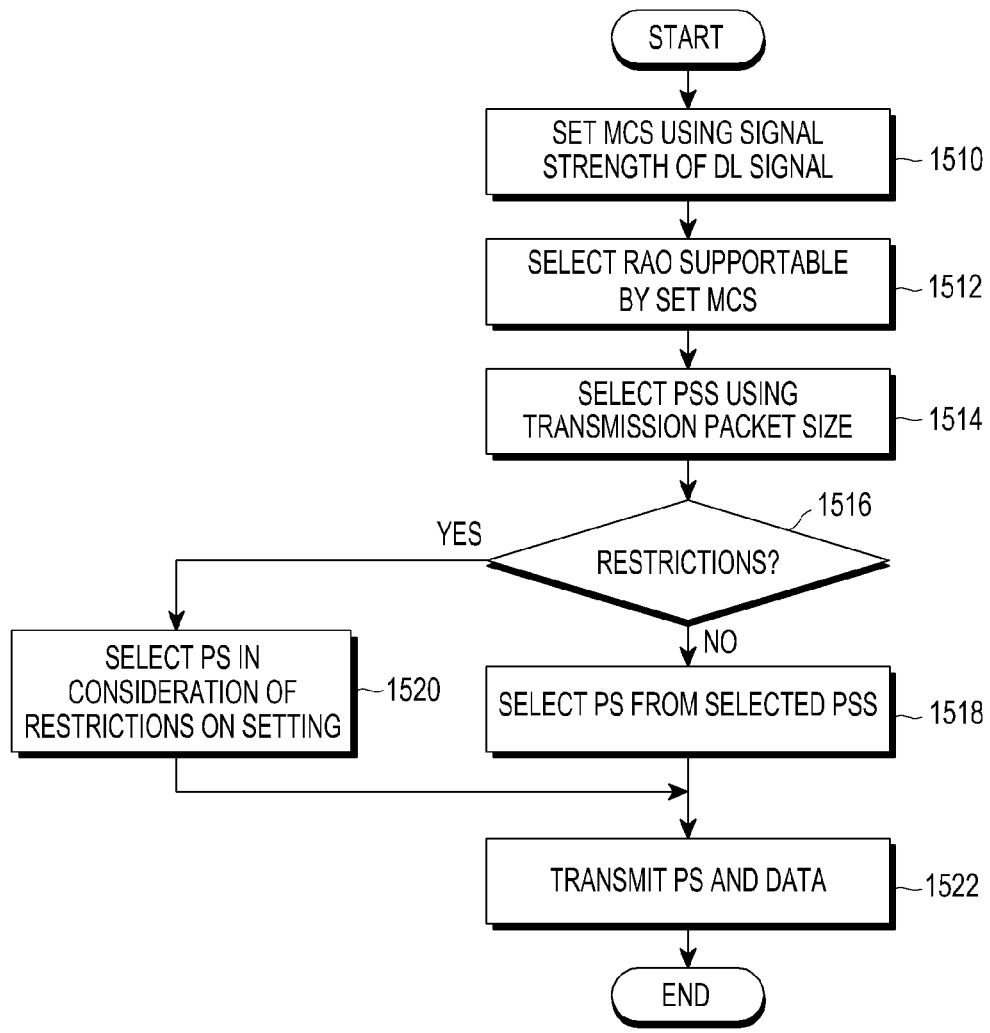
FIG. 15 is a diagram illustrating a control flow for performing superposition transmission by a transmission device according to various embodiments.

FIG. 15 is a diagram illustrating a control flow for performing superposition transmission by a transmission device according to various embodiments. The control flow in FIG. 15 assumes the mapping relationship between a selected resource and control information of FIG. 7.

Referring to FIG. 15, the transmission device measures the strength of a DL signal, and sets a MCS level corresponding to the measured signal strength in operation 1510. The transmission device may select an RAO supportable by the set MCS level in operation 1512. The transmission device selects a PSS previously set to correspond to a transmission packet size in operation 1514.

The transmission device determines whether restrictions on the usage of a time offset are set in association with the size of an encoded packet in a synchronous environment or an asynchronous environment in operation 1516. The restrictions on the usage of a time offset is to prepare an allowable time offset in order to prevent an event in which data is received outside a data superposition transmission area.

For example, the entire length of the data superposition transmission area may be limited by setting by the base station. Accordingly, restrictions on a time offset may need to be set in consideration of the size of the encoded packet that the device desires to transmit or a reception delay (RTT) that may occur in an asynchronous environment.

In operation 1518, the transmission device may select any one of PSs included in the PSS selected by the MCS, when restrictions on a time offset are not set. When the restrictions on a time offset are set, the transmission device calculates an allowable time offset, and selects a PS in consideration of the calculated allowable time offset in operation 1520.

For example, the transmission device may select at least one PS corresponding to a time offset that satisfies the calculated allowable time offset, from among PSs included in the PSS selected based on the MCS level. The transmission device may select any PS from the at least one selected PS.

As another example, the transmission device maps a time offset selected based on the allowed time offset to PSs, whereby the time offset that satisfies the allowable time offset may be used although any PS is selected from the selected PSS.

The allowable time offset may be determined to be different according to a synchronous environment and an asynchronous environment.

For example, in the synchronous environment, an RTT does not need to be taken into consideration. Accordingly, the transmission device may determine the allowable time offset by subtracting the size of an encoded packet from the entire length of the data superposition transmission area. Furthermore, a value corresponding to a guard interval may be determined, and the value may be additionally subtracted.

Conversely, in the asynchronous environment, an RTT needs to be taken into consideration. The transmission device may determine the allowable time offset by subtracting one-way delay time (RTT/2) and the size of an encoded packet from the entire length of the data superposition transmission area. Furthermore, a value corresponding to a guard interval may be determined, and the value may be additionally subtracted.

To this end, the transmission device may be capable of estimating an RTT. For example, the RTT may be estimated based on the signal strength of a downlink signal.

The transmission device transmits the selected PS in a preamble superposition transmission area, and transmits data encoded and modulated based on the determined control information, using the time offset previously set to correspond to the selected PS in operation 1522.

Figure 16:
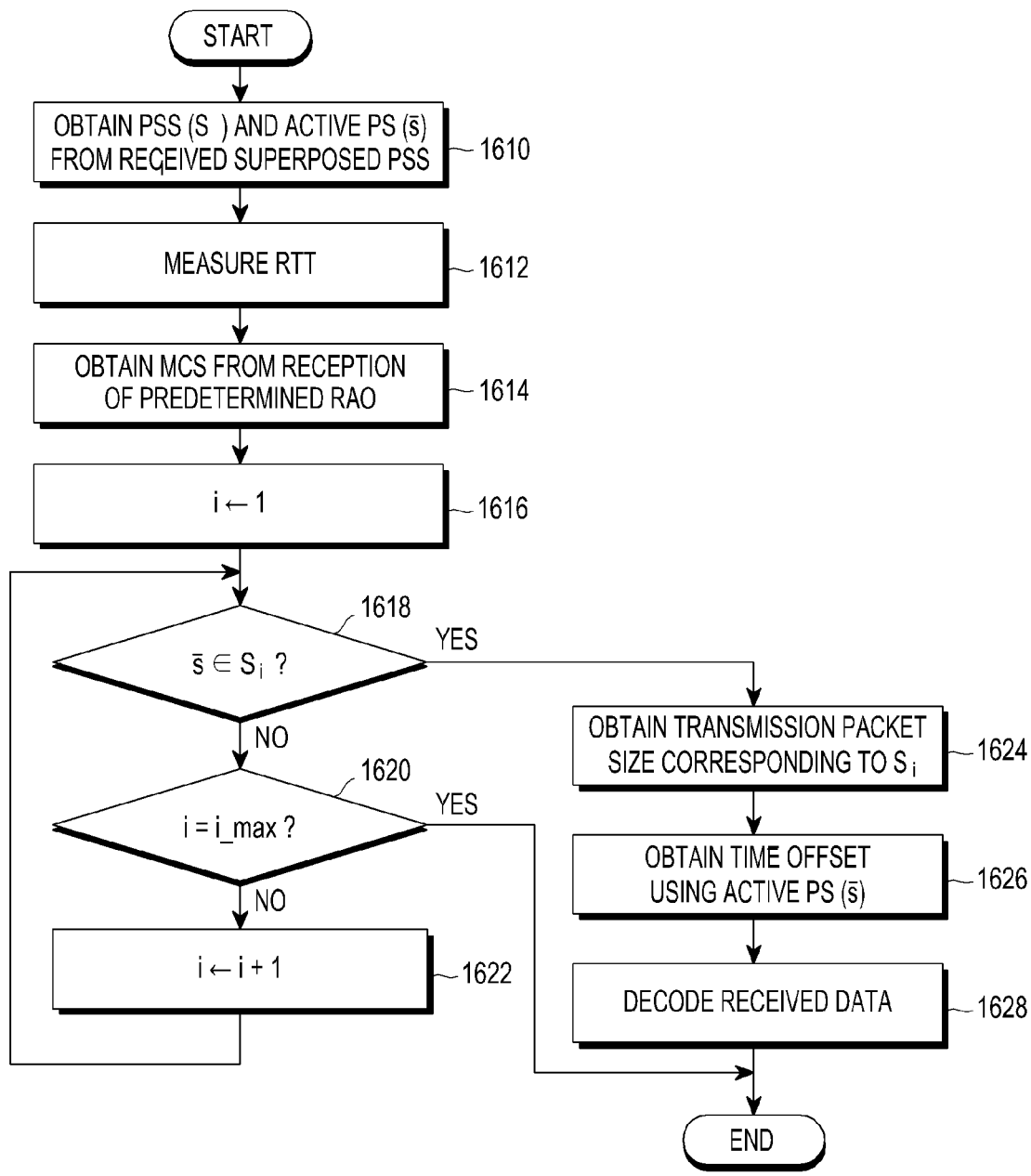
FIG. 16 is a diagram illustrating a control flow for performing superposition transmission by a reception device according to various embodiments.

FIG. 16 is a diagram illustrating a control flow for performing superposition transmission by a reception device according to various embodiments. The control flow in FIG. 16 assumes the mapping relationship between a selected resource and control information of FIG. 7.

Referring to FIG. 16, the reception device detects an active PS (s) from among PSs which are transmitted based on superposition transmission by a plurality of transmission devices in a preamble superposition transmission area, and obtains a PSS including the detected active PS in operation 1610.

The reception device measures an RTT based on a difference between the start point of a preamble reception area and a point in time at which the active PS is detected, when detecting the active PS in operation 1612.

The reception device may obtain an MCS level from reception of a predetermined RAO in operation 1614.

The reception device determines a PSS to which the obtained active PS belongs in operations 1616 to 1622. For example, the reception device initiates index i for selecting a PSS to 1 in operation 1616. The reception device determines whether the obtained PS belongs to an $i^{th}$ PSS in operation 1618. When the obtained PS does not belong to the $i^{th}$ PSS, the reception device determines whether the current i is the maximum value (i_max) in operation 1620. That is, whether the active PS is included is checked with respect to all PSSs. When all PSSs are not completely checked, the reception device may increase index i by 1, so as to select a subsequent PSS in operation 1622.

As described above, the reception device may identify a PSS that includes the active PS from among the previously set PSSs.

When the PSS including the active PS is identified, the reception device may obtain a transmission packet size previously set to correspond to the identified PSS in operation 1624. The reception device obtains a time offset previously set to correspond to the active PS in operation 1626.

The reception device may decode received data using the obtained control information, that is, the transmission packet size, the MCS, or the like in operation 1628. That is, the reception device may obtain the MCS information, the transmission packet size, the RTT information, and the time offset based on the active PS obtained from the received PS, whereby the reception device may decode the data received in the data superposition transmission area, using the obtained information.

Figure 17:
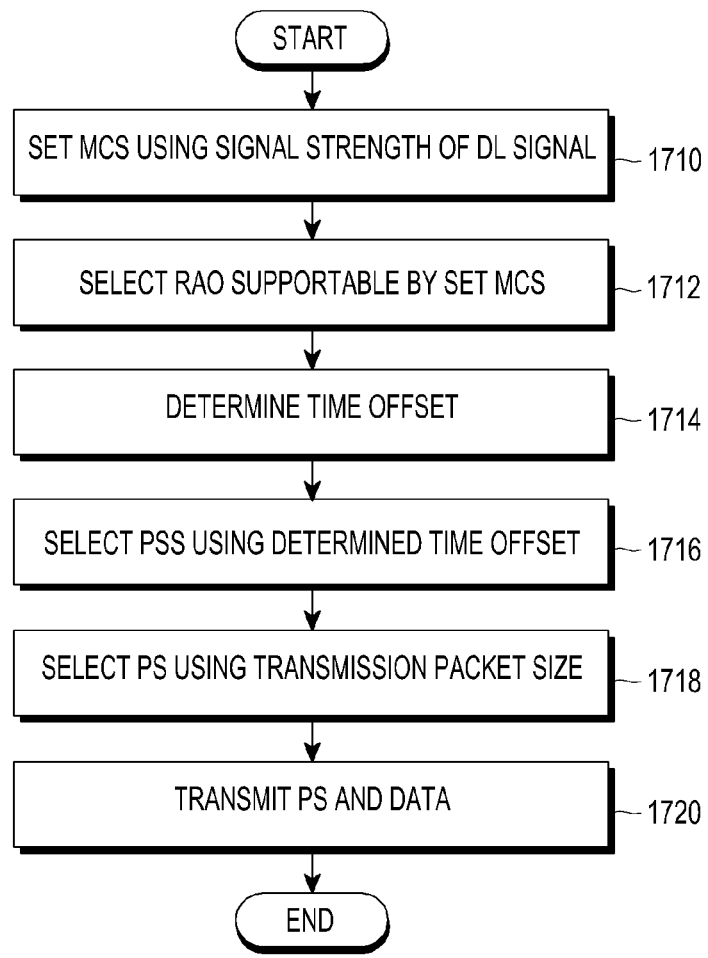
FIG. 17 is a diagram illustrating a control flow for performing superposition transmission by a transmission device according to various embodiments.

FIG. 17 is a diagram illustrating a control flow for performing superposition transmission by a transmission device according to various embodiments. The control flow in FIG. 17 assumes the mapping relationship between a selected resource and control information of FIG. 8.

Referring to FIG. 17, the transmission device measures the strength of a DL signal, and sets a MCS level corresponding to the measured signal strength in operation 1710. The transmission device may select an RAO supportable by the set MCS level in operation 1712. The transmission device may determine a time offset for data transmission in a data superposition transmission area in operation 1714. For example, the transmission device may select any one of the previously set time offsets.

As another example, the transmission device may determine a time offset by taking into consideration restrictions on the usage of a time offset.

Specifically, the transmission device determines whether restrictions on the usage of a time offset are set in association with the size of an encoded packet in a synchronous environment or an asynchronous environment. The restrictions on the usage of a time offset is to prepare an allowable time offset in order to prevent an event in which data is received outside a data superposition transmission area.

For example, the entire length of the data superposition transmission area may be limited by setting by the base station. Accordingly, restrictions on a time offset may need to be set in consideration of the size of the encoded packet that the device desires to transmit or a reception delay (RTT) that may occur in an asynchronous environment.

The transmission device may select any one of the PSs included in the PSS selected by the MCS, when restrictions on a time offset are not set. When the restrictions on a time offset are set, the transmission device calculates an allowable time offset, and selects a PS in consideration of the calculated allowable time offset.

For example, the transmission device may select at least one PS corresponding to a time offset that satisfies the calculated allowable time offset, from among the PSs included in the PSS selected based on the MCS level. The transmission device may select any PS from the at least one selected PS.

As another example, the transmission device maps a time offset selected based on the allowable time offset to PSs, whereby the time offset that satisfies the allowable time offset may be used although any PS is selected from the selected PSS.

The allowable time offset may be determined to be different according to a synchronous environment and an asynchronous environment.

For example, in the synchronous environment, an RTT does not need to be taken into consideration. Accordingly, the transmission device may determine the allowable time offset by subtracting the size of an encoded packet from the entire length of the data superposition transmission area. Furthermore, a value corresponding to a guard interval may be set, and the value may be additionally subtracted.

Conversely, in the asynchronous environment, an RTT needs to be taken into consideration. The transmission device may determine the allowable time offset by subtracting one-way delay time (RTT/2) and the size of an encoded packet from the entire length of the data superposition transmission area. Furthermore, a value corresponding to a guard interval may be set, and the value may be additionally subtracted.

To this end, the transmission device may be capable of estimating an RTT. For example, the RTT may be estimated based on the signal strength of a downlink signal.

The transmission device may select a PSS previously set to correspond to the determined time offset in operation 1716. The transmission device may select a PS corresponding to the transmission packet size from among the PSs included in the selected PSS in operation 1718.

The transmission device transmits the selected PS in a preamble superposition transmission area, and transmits data encoded and modulated based on the determined control information, using the time offset previously set to correspond to the selected PS in operation 1720.

Figure 18:
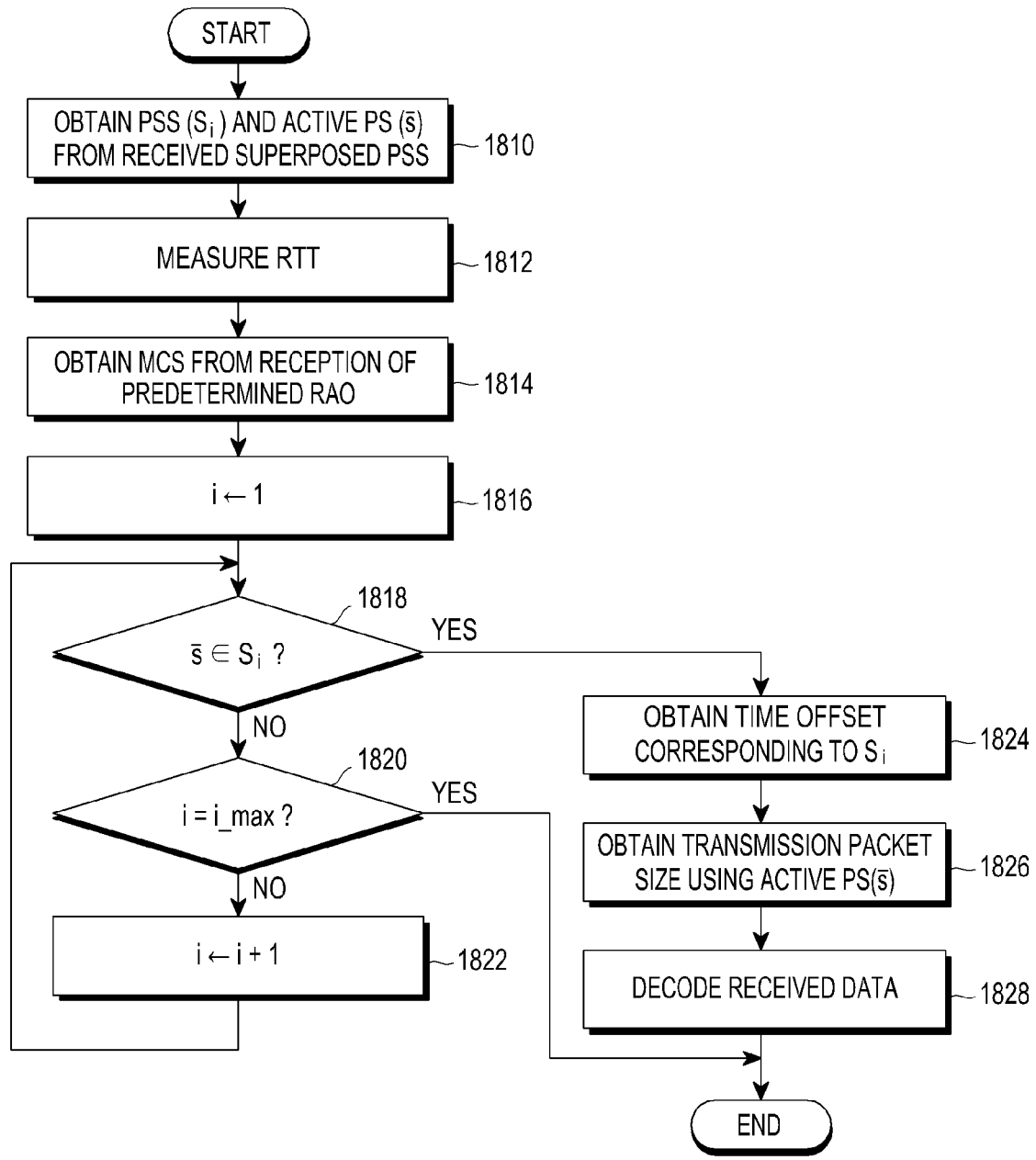
FIG. 18 is a diagram illustrating a control flow for performing superposition transmission by a reception device according to various embodiments.

FIG. 18 is a diagram illustrating a control flow for performing superposition transmission by a reception device according to various embodiments. The control flow in FIG. 18 assumes the mapping relationship between a selected resource and control information of FIG. 8.

Referring to FIG. 18, the reception device detects an active PS (s) from among PSs which are transmitted based on superposition transmission by a plurality of transmission devices in a preamble superposition transmission area, and obtains a PSS including the detected active PS in operation 1810.

The reception device measures an RTT based on a difference between the start point of a preamble reception area and a point in time at which the active PS is detected, when detecting the active PS in operation 1812.

The reception device may obtain an MCS level from reception of a predetermined RAO in operation 1814.

The reception device determines a PSS to which the obtained active PS belongs in operations 1816 to 1822. For example, the reception device initiates index i for selecting a PSS to 1 in operation 1816. The reception device determines whether the obtained PS belongs to an $i^{th}$ PSS in operation 1818. When the obtained PS does not belong to the $i^{th}$ PSS, the reception device determines whether the current i is the maximum value (i_max) in operation 1820. That is, whether the active PS is included is checked with respect to all PSSs. When all PSSs are not completely checked, the reception device may increase index i by 1, so as to select a subsequent PSS in operation 1822.

As described above, the reception device may identify a PSS that includes the active PS from among the previously set PSSs.

When the PSS including the active PS is identified, the reception device may obtain a time offset previously set to correspond to the identified PSS in operation 1824. The reception device obtains a transmission packet size previously set to correspond to the active PS in operation 1826.

The reception device may decode received data using the obtained control information, that is, the transmission packet size, the MCS, or the like in operation 1828. That is, the reception device may obtain the MCS information, the transmission packet size, the RTT information, and the time offset based on the active PS obtained from the received PS, whereby the reception device may decode the data received in the data superposition transmission area, using the obtained information.

Figure 19:
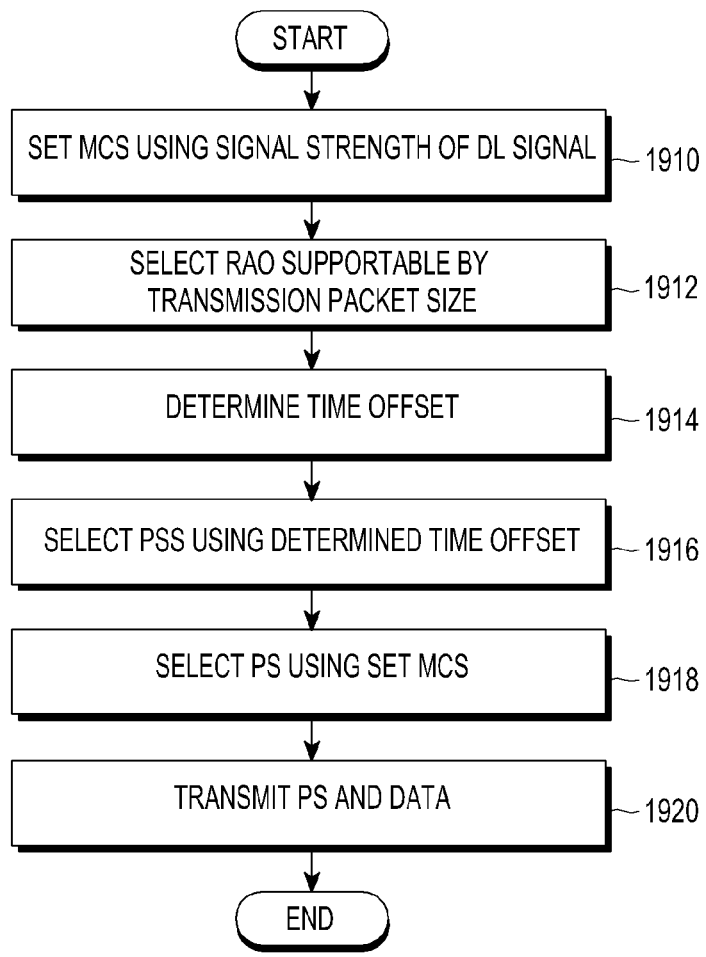
FIG. 19 is a diagram illustrating a control flow for performing superposition transmission by a transmission device according to various embodiments.

FIG. 19 is a diagram illustrating a control flow for performing superposition transmission by a transmission device according to various embodiments. The control flow in FIG. 19 assumes the mapping relationship between a selected resource and control information of FIG. 9.

Referring to FIG. 19, the transmission device measures the strength of a DL signal, and sets a MCS level corresponding to the measured signal strength in operation 1910. The transmission device may select an RAO supportable by the transmission packet size in operation 1912. The transmission device may determine a time offset for data transmission in a data superposition transmission area in operation 1914. For example, the transmission device may select any one of the previously set time offsets.

As another example, the transmission device may determine a time offset by taking into consideration restrictions on the usage of a time offset.

Specifically, the transmission device determines whether restrictions on the usage of a time offset are set in association with the size of an encoded packet in a synchronous environment or an asynchronous environment. The restrictions on the usage of a time offset is to prepare an allowable time offset in order to prevent an event in which data is received outside a data superposition transmission area.

For example, the entire length of the data superposition transmission area may be limited by setting by the base station. Accordingly, restrictions on a time offset may need to be set in consideration of the size of the encoded packet that the device desires to transmit or a reception delay (RTT) may occur in an asynchronous environment.

The transmission device may select any one of the PSs included in the PSS selected by the MCS, when restrictions on a time offset are not set. When the restrictions on a time offset are set, the transmission device calculates an allowable time offset, and selects a PS in consideration of the calculated allowable time offset.

For example, the transmission device may select at least one PS corresponding to a time offset that satisfies the calculated allowable time offset, from among the PSs included in the PSS selected based on the MCS level. The transmission device may select any PS from the at least one selected PS.

As another example, the transmission device maps a time offset selected based on the allowable time offset to PSs, whereby the time offset that satisfies the allowable time offset may be used although any PS is selected from the selected PSS.

The allowable time offset may be determined to be different according to a synchronous environment and an asynchronous environment.

For example, in the synchronous environment, an RTT does not need to be taken into consideration. Accordingly, the transmission device may determine the allowable time offset by subtracting the size of an encoded packet from the entire length of the data superposition transmission area. Furthermore, a value corresponding to a guard interval may be set, and the value may be additionally subtracted.

Conversely, in the asynchronous environment, an RTT needs to be taken into consideration. The transmission device may determine the allowable time offset by subtracting one-way delay time (RTT/2) and the size of an encoded packet from the entire length of the data superposition transmission area. Furthermore, a value corresponding to a guard interval may be set, and the value may be additionally subtracted.

To this end, the transmission device may be capable of estimating an RTT. For example, the RTT may be estimated based on the signal strength of a downlink signal.

The transmission device may select a PSS previously set to correspond to the determined time offset in operation 1916. The transmission device may select a PS corresponding to the set MCS level from among the PSs included in the selected PSS in operation 1918.

The transmission device transmits the selected PS in a preamble superposition transmission area, and transmits data encoded and modulated based on the determined control information, using the time offset previously set to correspond to the selected PS in operation 1920.

Figure 20:
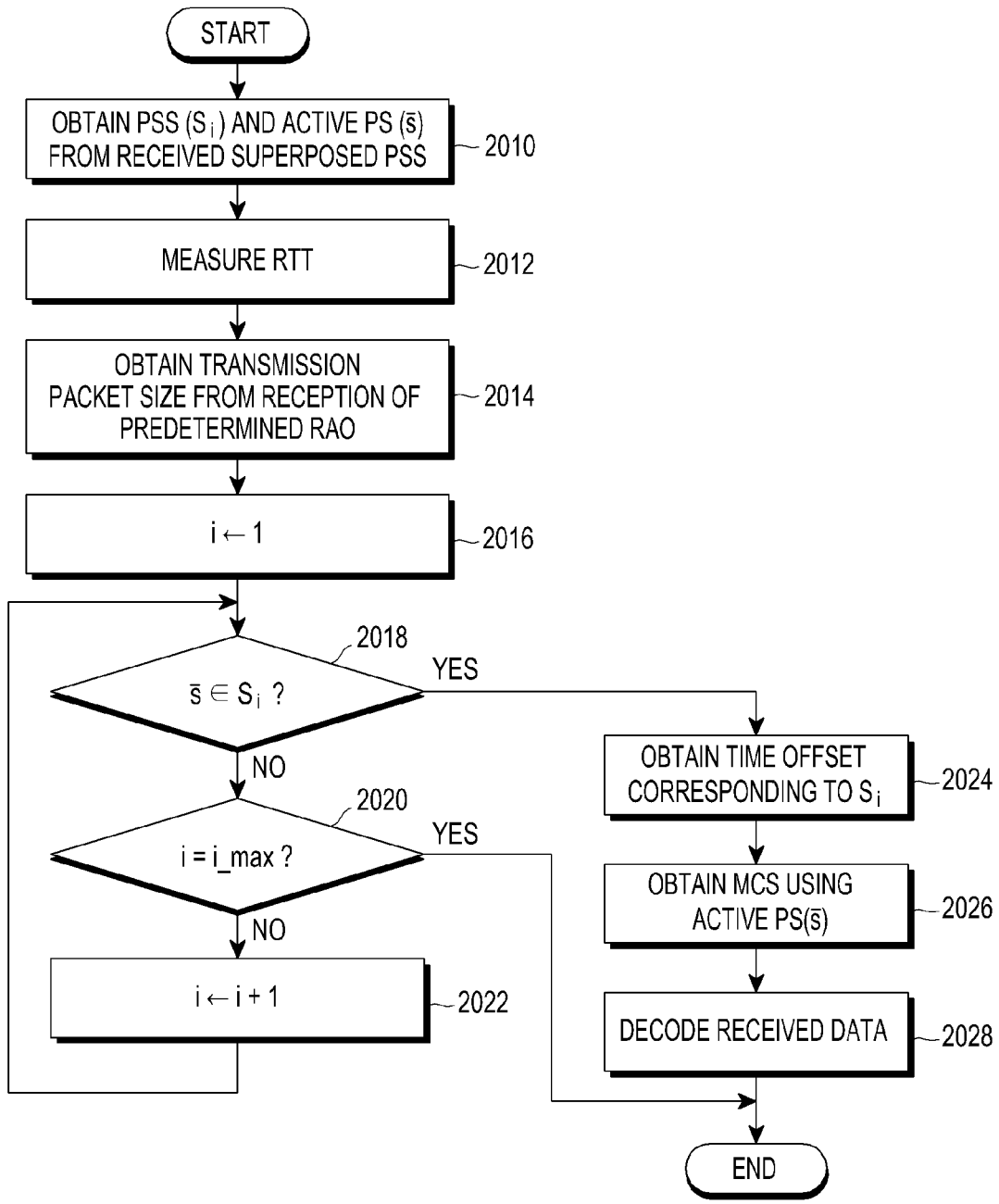
FIG. 20 is a diagram illustrating a control flow for performing superposition transmission by a reception device according to various embodiments.

FIG. 20 is a diagram illustrating a control flow for performing superposition transmission by a reception device according to various embodiments. The control flow in FIG. 20 assumes the mapping relationship between a selected resource and control information of FIG. 9.

Referring to FIG. 20, the reception device detects an active PS (s) from among PSs which are transmitted based on superposition transmission by a plurality of transmission devices in a preamble superposition transmission area, and obtains a PSS including the detected active PS in operation 2010.

The reception device measures an RTT based on a difference between the start point of a preamble reception area and a point in time at which the active PS is detected, when detecting the active PS in operation 2012.

The reception device may obtain a transmission packet size from reception of a predetermined RAO in operation 2014.

The reception device determines a PSS to which the obtained active PS belongs in operations 2016 to 2022. For example, the reception device initiates index i for selecting a PSS to 1 in operation 2016. The reception device determines whether the obtained PS belongs to an $i^{th}$ PSS in operation 2018. When the obtained PS does not belong to the $i^{th}$ PSS, the reception device determines whether the current i is the maximum value (i_max) in operation 2020. That is, whether the active PS is included is checked with respect to all PSSs. When all PSSs are not completely checked, the reception device may increase index i by 1, so as to select a subsequent PSS in operation 2022.

As described above, the reception device may identify a PSS that includes the active PS from among the previously set PSSs.

When the PSS including the active PS is identified, the reception device may obtain a time offset previously set to correspond to the identified PSS in operation 2024. The reception device obtains an MCS level previously set to correspond to the active PS in operation 2026.

The reception device may decode received data using the obtained control information, that is, the transmission packet size, the MCS, or the like in operation 2028. That is, the reception device may obtain the MCS information, the transmission packet size, the RTT information, and the time offset based on the active PS obtained from the received PS, whereby the reception device may decode the data received in the data superposition transmission area, using the obtained information.

Figure 21:
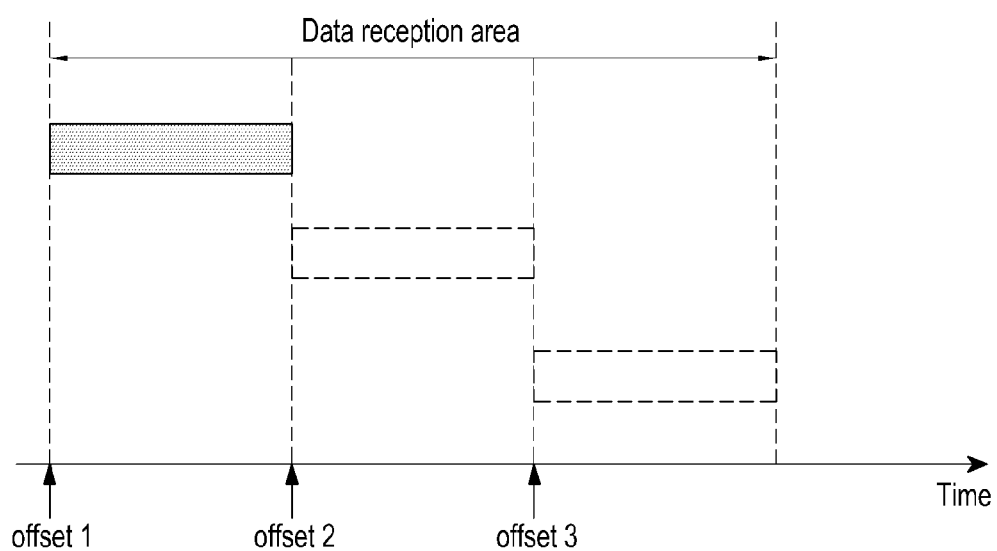
FIG. 21 is a conceptual diagram illustrating an example of discriminately allocating a time offset during superposition transmission according to various embodiments.

FIG. 21 is a conceptual diagram illustrating an example of discriminately allocating a time offset during superposition transmission according to various embodiments.

Referring to FIG. 21, time offsets 1, 2, and 3 are set in a data reception area such that mutual interference does not occur among data received from each device.

Figure 22:
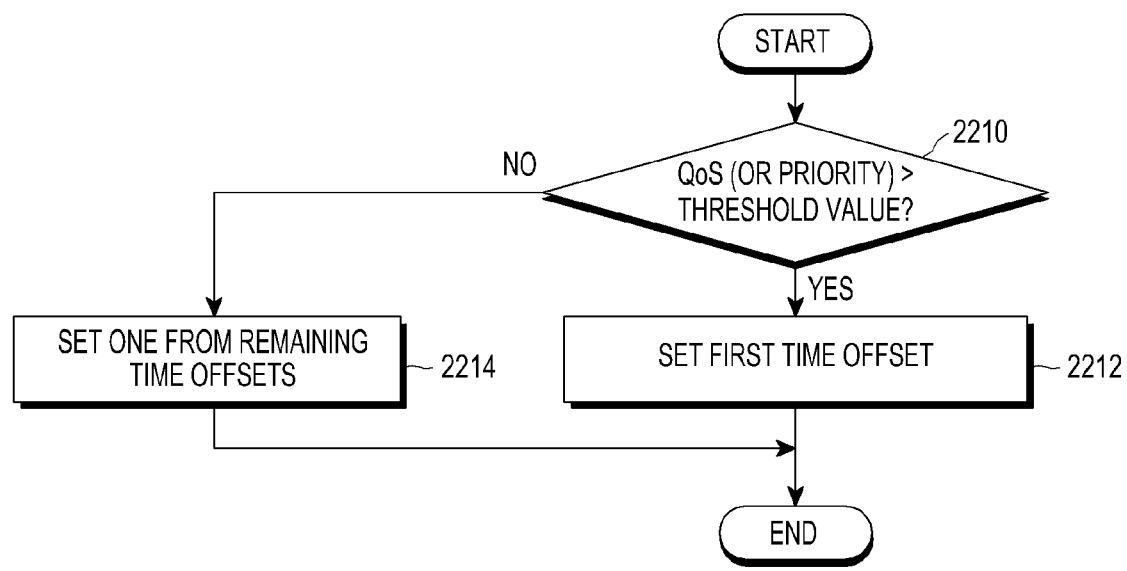
FIG. 22 is a diagram illustrating a control flow for setting a time offset for data transmission by a communication device that supports superposition transmission according to various embodiments.

FIG. 22 is a diagram illustrating a control flow for setting a time offset for data transmission, by a communication device that supports superposition transmission according to various embodiments.

Referring to FIG. 22, the communication device identifies a quality of service (QoS) or a priority of data to be transmitted, and determines whether the identified QoS or priority exceeds a previously set threshold value in operation 2210.

When the QoS or priority satisfies the previously set threshold value, the communication device may set a first time offset, which is previously set, in operation 2212. When the QoS or priority does not satisfy the previously set threshold value, the communication device may select one of the remaining time offsets, and may set the selected time offset in operation 2214.

Assigning a priority for each allowable time offset in order to secure QoS as described-above may be a restriction on selecting a corresponding time offset. When the time offset is selected in the above-described manner, a previously set time offset may be selected only when data having high QoS or high priority is transmitted. Otherwise, any one of the remaining offsets may be selected. This may cause the case in which a relatively small number of devices are superposed within a previously set time offset area.

Figure 23:
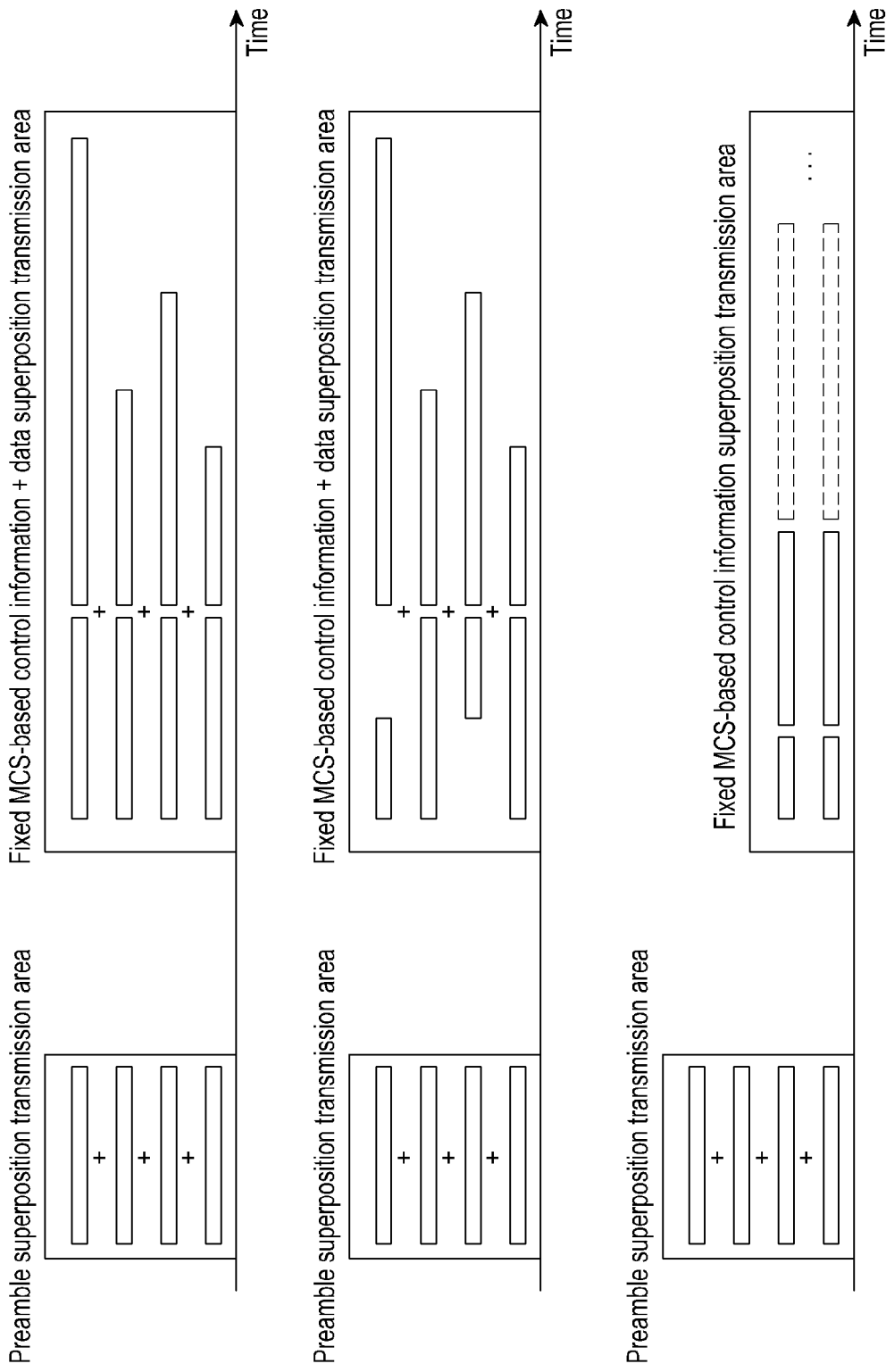
FIG. 23 is a diagram illustrating an example of operating a data superposition transmission area for superposition transmission according to various embodiments.

FIG. 23 is a diagram illustrating an example of operating a data superposition transmission area for superposition transmission according to various embodiments.

Referring to FIG. 23, in the topmost example, when each device transmits control information at a fixed MCS level in a data superposition transmission area, transmission at the most robust MCS level may cause inefficiency of resources and increase in physical overhead (PHY overhead), and interference may occur between physical headers (PHY headers).

To overcome the drawback, in the middle example of FIG. 23, an MCS level appropriate for each user in an area where control information is transmitted, whereby the corresponding control information is superposition-transmitted in a manner that disperses the control information. That is, when a PHY header based on a MCS level for each device is transmitted, selecting a transmission area of the PHY header is allowed, whereby interference may be alleviated.

For example, in the case of a device having a signal-to-noise ratio (SNR) and a good channel environment, interference may be the most significant deterioration factor of the actual reception performance. Accordingly, when the entire physical header area is selectively transmitted using a high-order MCS level, the reception performance may be improved by reducing mutual interference.

The middle example in FIG. 23 shows an example of setting a transmission location and a corresponding MCS based on a PSS and a PS. In this instance, the operation method may operate in a similar manner as setting a data superposition transmission area.

The bottom example of FIG. 23 illustrates an example of separately operating physical header transmission areas based on several fixed MCSs. That is, a physical header transmission area is set for each MCS class, and a transmission area is operated based thereon.

A beamforming-based system operating in an ultrahigh frequency (mmWave) band needs to use a predetermined beam for signal transmission and reception between a terminal and a base station by taking into consideration that a path loss is high in the ultrahigh frequency band. To this end, the terminal may obtain optimal beam information associated with the base station, based on signals received before performing an access procedure with the base station. For example, the terminal receives and measures a synchronization signal transmitted from the base station via each transmission beam of the base station, and may determine an optimal reception beam of the terminal and an optimal transmission beam of the base station, based on a measurement result. Alternatively, according to an embodiment, the terminal receives and measures a beamformed reference signal transmitted from the base station via each transmission beam of the base station, other than the synchronization signal, and may determine an optimal reception beam of the terminal and an optimal transmission beam of the base station for data transmission and reception. Hereinafter, for ease of description, the optimal reception beam of the terminal and the optimal transmission beam of the base station, which are determined by the terminal, is referred to as optimal transmission beam information. Conversely, the base station is not aware of the optimal beam information associated with a terminal that is to attempt to access, and thus, the base station may not configure the transmission beam of the base station and the reception beam of the terminal for receiving an access signal from the terminal.

To overcome the drawback, according to an embodiment of the present disclosure, it is assumed that a predetermined beam of a base station is allocated for each resource area used for an access procedure, that is, for each RAO, and the base station transmits, to a terminal in advance, mapping information associated with a beam allocated for each RAO in a manner of including the same in system information or the like. In this instance, the terminal may select an RAO using the mapping information obtained from the system information, and may attempt random access. The base station may use a reception beam allocated to an RAO from which reception of a random access signal is detected, so as to receive the corresponding random access signal.

Figure 24:
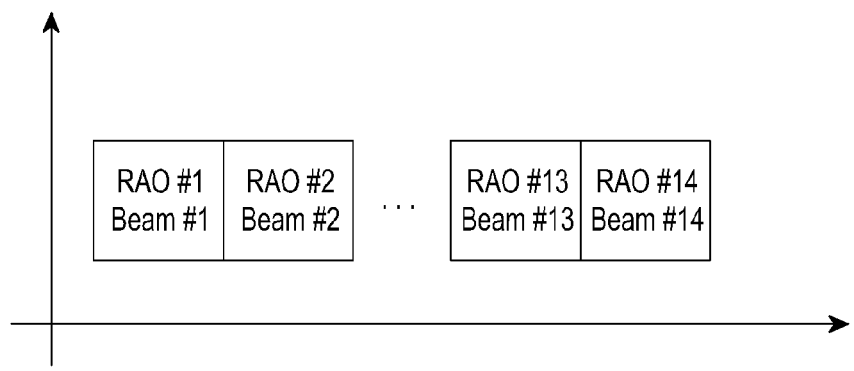
FIG. 24 is a diagram illustrating an example of mapping beams of a base station to RAOs, respectively, according to a proposed embodiment.

FIG. 24 is a diagram illustrating an example of mapping beams of a base station to RAOs, respectively, according to a proposed embodiment. Here, the beam of the base station is a reception beam for receiving an access signal transmitted by a terminal.

Referring to FIG. 24, 14 RAOs (RAO #1~RAO #14) are assumed, and the reception beams of the base station are one-to-one (1:1) mapped to the RAOs.

Figure 25:
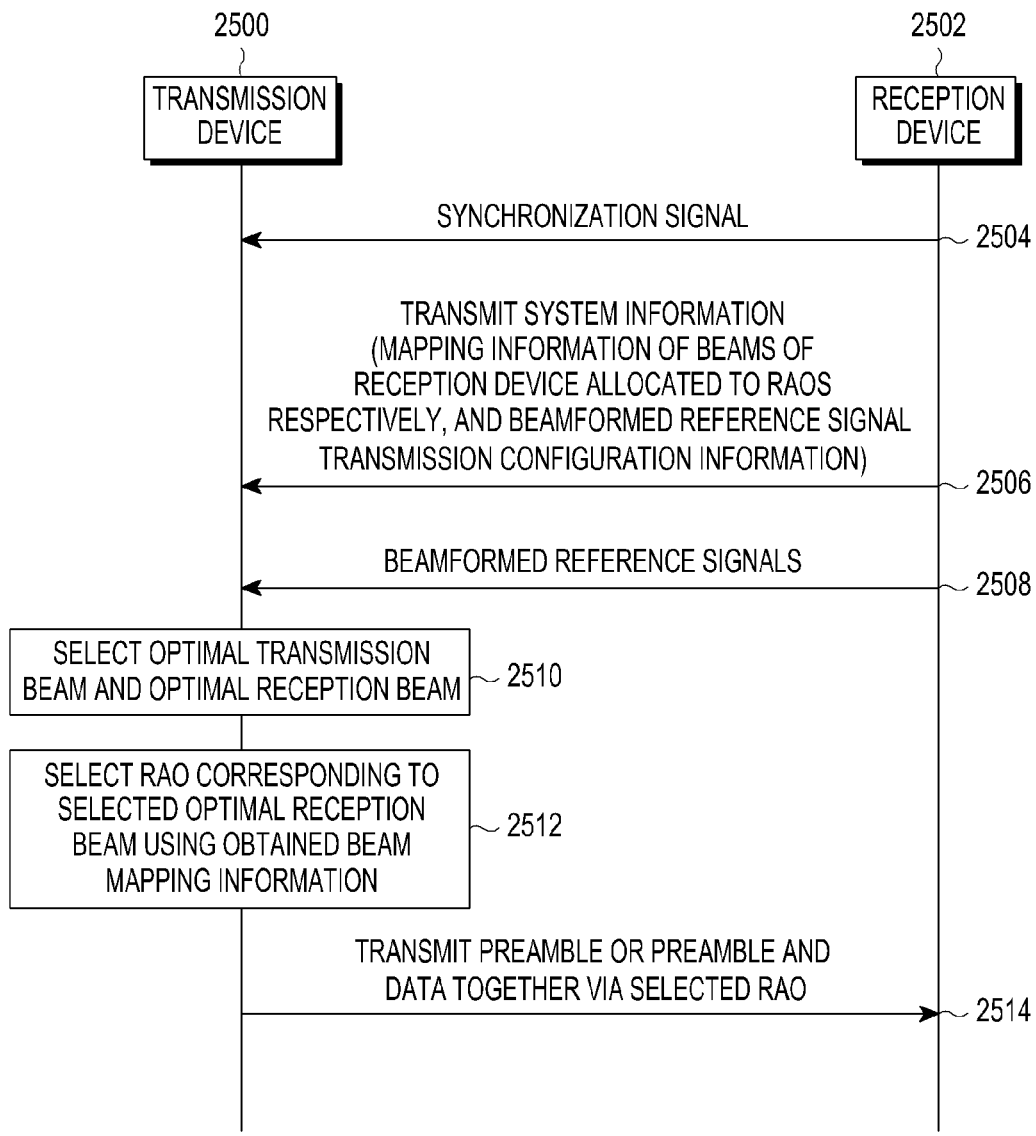
FIG. 25 is a flowchart illustrating an operation of performing random access according to various embodiments.

FIG. 25 is a flowchart illustrating an operation of performing random access according to various embodiments. The operation flow in FIG. 25 assumes the mapping relationship between an RAO and a beam of FIG. 24.

Referring to FIG. 25, a reception device 2502 transmits a synchronization signal via all configured beams in operation 2504. The reception device 2502 uses the received synchronization signal to synchronize with the transmission device 2500.

The reception device 2052 broadcasts system information via all beams in operation 2506. Here, the system information may include mapping information of the beams of the reception device 2502, which are allocated to RAOs, respectively, and transmission configuration information of a beamformed reference signal which is transmitted by the reception device 2502.

The transmission device 2500 may receive the beamformed reference signal, based on the transmission configuration information of the beamformed reference signal obtained from the system information in operation 2508. The transmission device 2500 may determine an optimal transmission beam for performing a random access procedure of transmission device 2500, and an optimal reception beam of the reception device 2502, based on a result of measurement of the received beamformed reference signals in operation 2510. The embodiment of FIG. 25 has described the case in which the transmission device 2500 determines optimal transmission/reception beams based on a result of measurement of beamformed reference signals, but according to another embodiment, the transmission device 2500 may determine optimal transmission/reception beams based on a result of measurement of a synchronization signal transmitted for each beam of the reception device 2502 in operation 2504.

When the optimal transmission/reception beams are determined, the transmission device 2500 may select an RAO to which the selected optimal reception beam of the reception device 2502 is allocated, using mapping information of the beams of the reception device 2502 allocated to RAOs, respectively, which is obtained from the system information. The transmission device 2500 may transmit a preamble sequence for random access or may transmit a preamble sequence and data (preamble sequence+data) together, via the selected RAO. In the transmission operation in operation 2514, when the selected RAO is configured to allocate preamble sequence transmission and data transmission to independent time intervals, respectively, as shown in the embodiment of FIG. 2, the preamble sequence and the data may be respectively transmitted in the corresponding signal time domains. When the selected RAO is configured in the form of a single subframe, whereby the preamble sequence and the data are allocated in a continuous time interval, preamble sequence transmission and data transmission may be consecutively performed at once. Then, the reception device 2502 receives the preamble or receives the preamble and data via a reception beam allocated to the selected RAO, whereby a signal for random access may be reliably transmitted.

Although detailed descriptions of the present disclosure have described detailed embodiments, it is apparent that those skilled in the art could make various modifications without departing from the scope of the various embodiments of the present disclosure. Therefore, the scope of the present disclosure should not be limited by the above-described embodiments, but should be defined by the scope of claims described below and the equivalents thereto. Furthermore, the modifications should not be understood as ideas or aspects separate from those of the present disclosure.

The invention claimed is:

1. A method of performing superposition transmission of data by a communication device, the method comprising:
   determining control information for the superposition transmission;
   determining a selected resource, based on the determined control information;
   transmitting a preamble sequence (PS), based on the selected resource, in a preamble transmission area of the superposition transmission; and
   transmitting data based on the determined control information in a data superposition transmission area of the superposition transmission,
   wherein the selected resource comprises a random access opportunity (RAO), a preamble sequence set (PSS), and the PS
   wherein the control information comprises a transmission packet size, a modulation and coding scheme (MCS) level, and a time offset for the data transmission in the data superposition transmission area, and
   wherein a set of the RAO, the PSS and the PS included in the selected resource is mapped to a set of the transmission packet size, the MCS level, and the time offset for the data transmission included in the control information.

2. The method of claim 1, wherein the determining the selected resource comprises:
   receiving a synchronization signal from a target device to perform synchronization, and determining a reception beam of the target device, based on a result of measurement of the received synchronization signal;
   receiving system information from a target base station with which synchronization is performed; and
   selecting the RAO to which the determined reception beam is allocated from among a plurality of previously set RAOs, based on reception beam information of the target device obtained from the system information, the reception beam information indicating information associated with reception beams of the target device allocated to the plurality of previously set RAOs, respectively.

3. The method of claim 1, wherein, if a variable packet size is used for the superposition transmission, the RAO, the PSS, and the PS included in the selected resource are previously set to correspond to the transmission packet size, the MCS level, and the time offset included in the control information in a manner of one-to-one match.

4. The method of claim 1, wherein determining the selected resource comprises:
   selecting the RAO that corresponds to the transmission packet size included in the control information or that is supportable by the MCS level included in the control information, from among a plurality of previously set RAOs and selecting the PSS that corresponds to the MCS level included in the control information from among a plurality of previously set PSSs, or selecting an RAO that is supportable by an MCS level included in the control information from among the plurality of previously set RAOs and selecting a PSS that corresponds to the transmission packet size included in the control information from among the plurality of previously set PSSs; and
   selecting the PS from among preamble sequences (PSs) in the selected PSS,
   wherein a time offset that is previously set to correspond to the selected PS is determined as the time offset for the data transmission in the data superposition transmission area included in the control information.

5. The method of claim 4, wherein selecting the PS comprises:
   estimating a round trip time (RTT) associated with the superposition transmission; and
   selecting the PS from among the PSs in the selected PSS by taking into consideration the estimated RTT and a size of an encoded packet,
   wherein a time offset that is previously set to correspond to the selected PS does not exceed a maximum time offset allowed within the data superposition transmission area, which is determined based on the estimated RTT and the size of an encoded packet.

6. The method of claim 4, wherein, if the PS is selected from among the PSs within the selected PSS, at least one of quality of service and a priority associated with the superposition transmission is taken into consideration.

7. A method of receiving data based on superposition transmission by a communication device, the method comprising:
   receiving a preamble sequence (PS) in a preamble transmission area of the superposition transmission;
   determining, from the received PS, a selected resource used for transmitting the received PS;
   selecting a piece of control information corresponding to the selected resource from among a plurality of pieces of previously set control information;
   receiving data transmitted in a data superposition transmission area of the superposition transmission using the selected resource; and
   decoding the received data based on the selected control information,
   wherein the selected resource comprises a random access opportunity (RAO), a preamble sequence set (PSS), and a second PS,
   wherein the control information comprises a transmission packet size, a modulation and coding scheme (MCS) level, and a time offset for the data transmission within the data superposition transmission area, and
   wherein a set of the RAO, the PSS and the PS included in the selected resource is mapped to a set of the transmission packet size, the MCS level, and the time offset for the data transmission included in the control information.

8. The method of claim 7, wherein receiving the PS comprises:
   transmitting a synchronization signal for each beam of the communication device;
   broadcasting system information including reception beam information of the communication device, the reception beam information indicating information associated with beams allocated to a plurality of previously set RAOs, respectively; and
   receiving the PS via a reception beam allocated to an RAO where reception of the PS is detected from among the plurality of previously set RAOs, wherein the reception beam corresponds to an optimal reception beam which is selected based on a result of measurement of the synchronization signal that a target device receives.

9. The method of claim 7, wherein, if a variable packet size is used for the superposition transmission, the transmission packet size, the MCS level, and the time offset included in the control information are previously set to correspond to the RAO, the PSS, and the PS included in the selected resource in a manner of one-to-one match.

10. The method of claim 7, wherein determining the selected resource comprises:
   detecting an active PS from among superposed preamble sequences (PSs) in the received PS;
   selecting a PSS including the detected active PS from among a plurality of previously set PSSs; and
   estimating a round trip time, if detecting the PS.

11. The method of claim 10, wherein selecting the control information comprises:
   obtaining the transmission packet size from data received in the RAO and obtaining the MCS level that is previously set to correspond to the selected PSS, or obtaining a used MCS level from the data received in the RAO, or obtaining a used MCS level from the data received in the RAO and obtaining the transmission packet size previously set to correspond to the selected PSS; and
   obtaining the time offset previously set to correspond to the detected active PS.

12. A communication device for performing superposition transmission of data, the communication device comprising:
   a controller configured to:
      determine control information for the superposition transmission, and
      determine a selected resource, based on the determined control information; and
   a transmitter configured to:
      transmit a preamble sequence (PS), based on the selected resource, in a preamble transmission area of the superposition transmission, and
      transmit data based on the determined control information in a data superposition transmission area of the superposition transmission,
   wherein the selected resource comprises a random access opportunity (RAO), a preamble sequence set (PSS), and the PS,
   wherein the control information comprises a transmission packet size, a modulation and coding scheme (MCS) level, and a time offset for the data transmission in the data superposition transmission area, and
   wherein a set of the RAO, the PSS and the PS included in the selected resource is mapped to a set of the transmission packet size, the MCS level, and the time offset for the data transmission included in the control information.

13. The communication device of claim 12, wherein the controller is configured to receive a synchronization signal from a target device to perform synchronization, and determining a reception beam of the target device, based on a result of measurement of the received synchronization signal, receive system information from a target base station with which synchronization is performed, and select the RAO to which the determined reception beam is allocated from among a plurality of previously set RAOs, based on reception beam information of the target device obtained from the system information,
   wherein the reception beam information indicates information associated with reception beams of the target device allocated to the plurality of previously set RAOs, respectively.

14. The communication device of claim 12, wherein, when a variable packet size is used for the superposition transmission, the RAO, the PSS, and the PS included in the selected resource are previously set to correspond to the transmission packet size, the MCS level, and the time offset included in the control information in a manner of one-to-one match.

15. The communication device of claim 12, wherein the controller is configured to select the RAO that corresponds to the transmission packet size included in the control information or that is supportable by the MCS level included in the control information, from among a plurality of previously set RAOs and selecting the PSS that corresponds to the MCS level included in the control information from among a plurality of previously set PSSs, or selecting an RAO that is supportable by the MCS level included in the control information from among the plurality of previously set RAOs and selecting a PSS that corresponds to the transmission packet size included in the control information from among the plurality of previously set PSSs; and select the PS from among preamble sequences (PSs) in the selected PSS,
   wherein a time offset that is previously set to correspond to the selected PS is determined as the time offset for the data transmission in the data superposition transmission area included in the control information.

16. The communication device of claim 15, wherein the controller is configured to estimate a round trip time (RTT) associated with the superposition transmission, and select the PS from among the PSs in the selected PSS by taking into consideration the estimated RTT and a size of an encoded packet,
   wherein a time offset that is previously set to correspond to the selected PS does not exceed a maximum time offset allowed within the data superposition transmission area, which is determined based on the estimated RTT and the size of an encoded packet.

17. The communication device of claim 15, wherein, if the PS is selected from among the PSs within the selected PSS, at least one of quality of service and a priority associated with the superposition transmission is taken into consideration.

* * * * *